(12) United States Patent
Wei et al.

(10) Patent No.: US 11,561,664 B2
(45) Date of Patent: Jan. 24, 2023

(54) TOUCH DISPLAY PANEL FOR IMPROVE ANTISTATIC BREAKDOWN CAPABILITY OF TOUCH ELECTRODES, AND TOUCH DISPLAY DEVICE

(71) Applicants: WUHAN TIANMA MICRO-ELECTRONICS CO., LTD, Wuhan (CN); WUHAN TIANMA MICROELECTRONICS CO., LTD. SHANGHAI BRANCH, Shanghai (CN)

(72) Inventors: Qibing Wei, Shanghai (CN); Min Chen, Shanghai (CN); Xinzhao Liu, Shanghai (CN)

(73) Assignees: WUHAN TIANMA MICROELECTRONICS CO., LTD., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 17/530,239

(22) Filed: Nov. 18, 2021

(65) Prior Publication Data

US 2022/0075467 A1 Mar. 10, 2022

(30) Foreign Application Priority Data

Apr. 26, 2021 (CN) .......................... 202110453089.7

(51) Int. Cl.
*G06F 3/045* (2006.01)
*G06F 3/041* (2006.01)

(52) U.S. Cl.
CPC .......... *G06F 3/045* (2013.01); *G06F 3/04164* (2019.05); *G06F 3/0418* (2013.01)

(58) Field of Classification Search
CPC .. G06F 2203/04111; G06F 2203/04112; G06F 3/04164; G06F 3/0418; G06F 3/0443; G06F 3/0446; G06F 3/0448; G06F 3/045
See application file for complete search history.

(56) References Cited

U.S. PATENT DOCUMENTS

| | | | |
|---|---|---|---|
| 10,564,743 B2 * | 2/2020 | Kang | ...................... G06F 3/041 |
| 2014/0347319 A1 * | 11/2014 | Lin | ...................... G06F 3/0445 |
| | | | 345/174 |

(Continued)

FOREIGN PATENT DOCUMENTS

| | | |
|---|---|---|
| CN | 104808833 A | 7/2015 |
| CN | 108628497 A | 10/2018 |

*Primary Examiner* — Chun-Nan Lin
(74) *Attorney, Agent, or Firm* — Christensen O'Connor Johnson Kindness PLLC

(57) ABSTRACT

A touch display panel and a touch display device are provided, relate to the field of display technology. In an embodiment, the touch display panel includes a plurality of first touch electrode units and a plurality of second touch electrode units. In an embodiment, each of the first touch electrode units includes first touch electrodes and first connection portions alternately arranged in a first direction. In an embodiment, each of the first touch electrodes includes at least one first touch electrode sub-unit that includes a plurality of first electrode sub-groups. In an embodiment, each of the first electrode sub-groups includes at least one first sub-electrode. In an embodiment, in each of the at least one first touch electrode sub-unit, the first sub-electrodes of two adjacent first electrode sub-groups have gradually increasing lengths and gradually decreasing widths in a direction from one of the first connection portions closest to the first touch electrode sub-unit to the first touch electrode.

17 Claims, 20 Drawing Sheets

(56) References Cited

U.S. PATENT DOCUMENTS

| | | | |
|---|---|---|---|
| 2015/0160760 A1* | 6/2015 | Sato | G06F 3/0412 |
| | | | 345/174 |
| 2015/0212617 A1* | 7/2015 | Yoo | G06F 3/0445 |
| | | | 345/174 |
| 2017/0038864 A1* | 2/2017 | Kuo | G06F 3/0448 |
| 2017/0139512 A1* | 5/2017 | Kim | G06F 3/0448 |
| 2017/0160847 A1* | 6/2017 | Huo | G06F 3/0443 |
| 2021/0109616 A1* | 4/2021 | Park | G06F 3/0412 |
| 2021/0141491 A1* | 5/2021 | Gogte | G06F 3/04164 |
| 2021/0208715 A1* | 7/2021 | Yang | H01L 51/5221 |
| 2021/0405823 A1* | 12/2021 | Wu | G06F 3/0443 |
| 2022/0100316 A1* | 3/2022 | Yu | G06F 3/0445 |

\* cited by examiner

TOUCH DISPLAY PANEL FOR IMPROVE ANTISTATIC BREAKDOWN CAPABILITY OF TOUCH ELECTRODES, AND TOUCH DISPLAY DEVICE

CROSS-REFERENCE TO RELATED APPLICATIONS

The present application claims priority to Chinese Patent Application No. 202110453089.7, filed on Apr. 26, 2021, the content of which is incorporated herein by reference in its entirety.

TECHNICAL FIELD

The present disclosure relates to the field of display technology, and in particular, to a touch display panel and a touch display device.

BACKGROUND

In recent years, with the rapid development of digital information and wireless mobile communication technology, many electronic products, such as mobile phones, have used a touch screen as an input device instead of a traditional keyboard or mouse, in order to achieve portability and lightness.

A display panel is required to be additionally provided with a touch electrode in order to integrate touch functions on the display panel. A current research focus is how to ensure electrical reliability of the touch electrode, improve antistatic capability of the touch electrode, and avoid electrostatic breakdown of the touch electrode.

SUMMARY

In view of this, at least one of embodiments of the present disclosure provides a touch display panel and a touch display device to solve the problem that static charges are easily accumulated sufficient to break down touch electrodes, in order to improve antistatic breakdown capability of the touch electrodes.

In one aspect of the present disclosure, at least one embodiment of the present disclosure provides a touch display panel, including:

a plurality of first touch electrode units, wherein each of the plurality of first touch electrode units includes first touch electrodes and first connection portions that are alternately arranged in a first direction, each of the first connection portions is configured to connect two adjacent first touch electrodes of the first touch electrodes with each other, and the plurality of first touch electrode units is arranged in a second direction; and a plurality of second touch electrode units, wherein each of the plurality of second touch electrode units includes second touch electrodes and second connection portions that are alternately arranged in the second direction, each of the second connection portions is configured to connect two adjacent second touch electrodes of the second touch electrodes with each other, and the plurality of second touch electrode units is arranged in the first direction, wherein each of the first touch electrodes includes at least one first touch electrode sub-unit, each of the at least one first touch electrode sub-unit includes a plurality of first electrode sub-groups arranged in the first direction, and each of the plurality of first electrode sub-groups includes at least one first sub-electrode extending in the second direction;

wherein in each of the at least one first touch electrode sub-unit, the first sub-electrodes of two adjacent first electrode sub-groups have lengths gradually increasing in a direction from one of the first connection portions closest to the first touch electrode sub-unit to the first touch electrode sub-unit, and widths gradually decreasing in the direction from the one of the first connection portions closest to the first touch electrode sub-unit to the first touch electrode sub-unit; and wherein the at least one first sub-electrode has a length direction parallel to the second direction and a width direction perpendicular to the second direction.

In another aspect of the present disclosure, at least one embodiment of the present disclosure provides a touch display device including the touch display panel as described above.

BRIEF DESCRIPTION OF DRAWINGS

Accompanying drawings used in embodiments of the present disclosure will be briefly described hereafter in order to illustrate technical solutions of the present disclosure clearer. It should be understood that the embodiments described below are merely some of, rather than all of the embodiments of the present disclosure. Other accompanying drawings may be obtained by those skilled in the art without any inventive step based on these accompanying drawings.

DESCRIPTION OF EMBODIMENTS

Embodiments of the present disclosure will be described in detail hereinafter with reference to the accompanying drawings in order to understand technical solutions of the present disclosure.

It should be understood that the embodiments described below are merely some of, rather than all of the embodiments of the present disclosure. Based on the embodiments of the present disclosure, all other embodiments made by those skilled in the art without any inventive step shall fall within the scope of the present disclosure.

The terms used in the embodiments of the present disclosure are merely for the purpose of describing specific embodiments, and are not intended to limit the present invention. The singular forms of "a", "said" and "the" used in the embodiments and the appended claims of the present disclosure are also intended to include plural forms, unless otherwise stated.

It should be appreciated that the term "and/or" used herein is only an association relationship for describing associated objects, which means there are three relationships between the associated objects. For example, A and/or B may mean that three cases including A is included only, both A and B are included, and B is included only. In addition, the character "/" used herein generally indicates that the associated objects in an "or" relationship.

It should be understood that although the terms "first", "second", etc. may be used to describe touch electrodes in the embodiments of the present disclosure, these touch electrodes should not be limited thereto. These terms are merely used to distinguish the touch electrodes from each other. For example, without departing from the scope of the embodiments of the present disclosure, the first touch electrode may also be referred to as the second touch electrode. Similarly, the second touch electrode may also be referred to as the first touch electrode.

Figure 1:
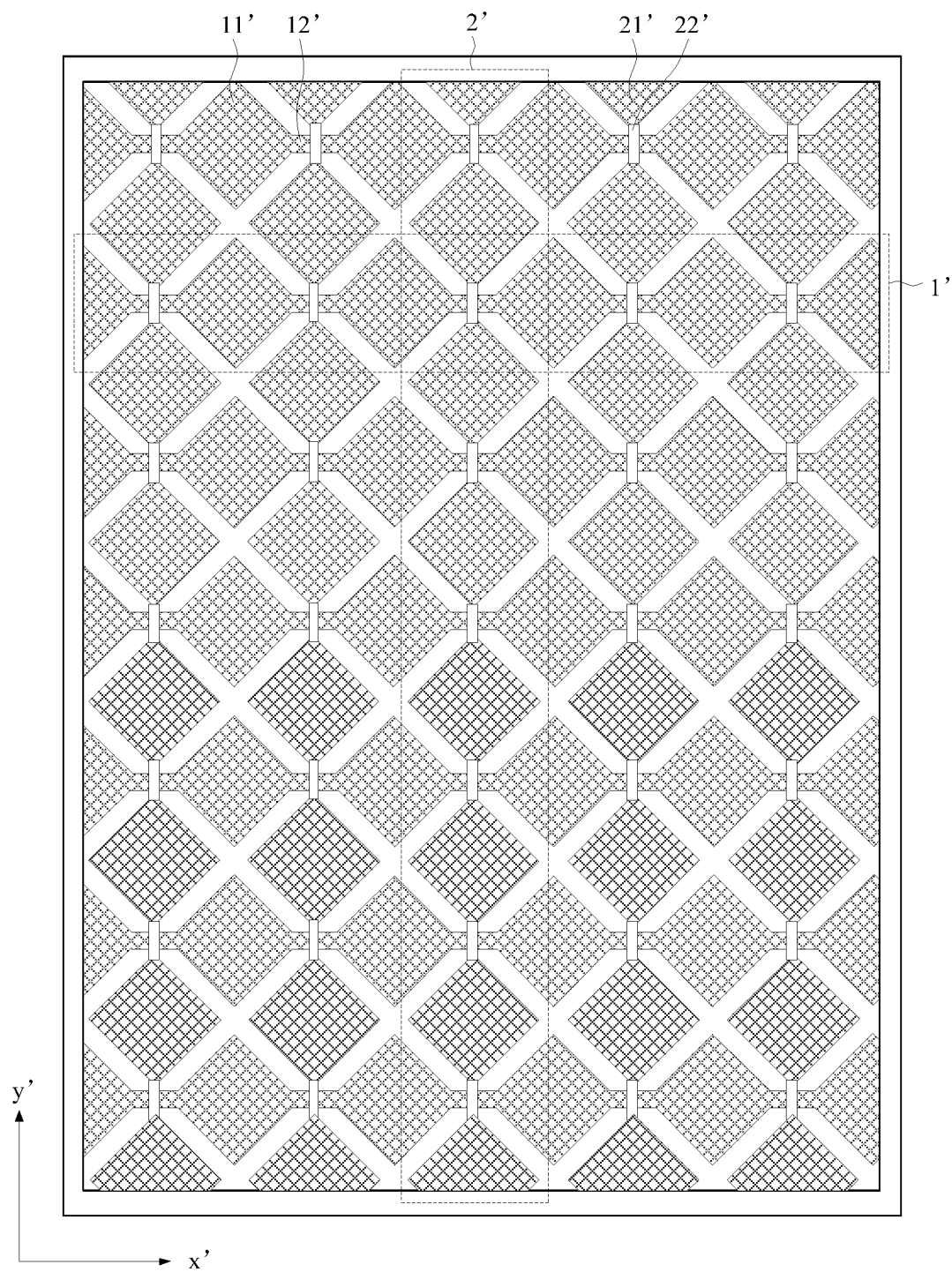
FIG. 1 is a schematic view of a touch display panel in the related art.

During implementing the embodiments of the present disclosure, the inventor found that, as shown in FIG. 1 illustrating a schematic view of a touch display panel in the related art, the touch display panel includes a plurality of first touch electrode units 1' and a plurality of second touch electrode units 2'. Each of the first touch electrode units 1' includes first touch electrodes 11' and first connection portions 12' arranged alternately in a first direction x'. Each of the first connection portions 12' is configured to connect two adjacent first touch electrodes 11' with each other. The plurality of first touch electrode units 1' is arranged in a second direction y'. Each of the second touch electrode units 2' includes second touch electrodes 21' and second connection portions 22' alternately arranged in the second direction y'. Each of the second connection portions 22' is configured to connect two adjacent second touch electrodes 21' with each other. The plurality of second touch electrode units 2' is arranged in the first direction x'.

As shown in FIG. 1, each of the first touch electrodes 11' and the second touch electrodes 21' has a substantially diamond outer profile. Further, the first touch electrode 11' has different lengths at different positions in the second direction y', and the second touch electrode 21' has different lengths at different positions in the first direction x'. Furthermore, the first connection portion 12' for connecting the two adjacent first touch electrodes 11' with each other has an area much smaller than that of the first touch electrode 11', and the second connection portion 22' for connecting the two adjacent second touch electrodes 21' with each other has an area much smaller than that of the second touch electrode 21'. The touch electrode arrangement shown in FIG. 1 may result in large difference in resistance at different positions in the first touch electrode 11' and the second touch electrode 21'. In particular, the resistance is greatly changed at the boundary between the first connection portion 12' and the first touch electrode 11' as well as at the boundary between the second connection portion 22' and the second touch electrode 21'. When static electricity is transmitted inwardly from edges of the first touch electrode units 1' and the second touch electrode units 2', an electrostatic breakdown would be easily generated at positions in the first touch electrode units 1' and the second touch electrode units 2' where the resistance is greatly changed, and there is a risk of touch failure in in a case that the electrostatic breakdown is severe.

Figure 2:
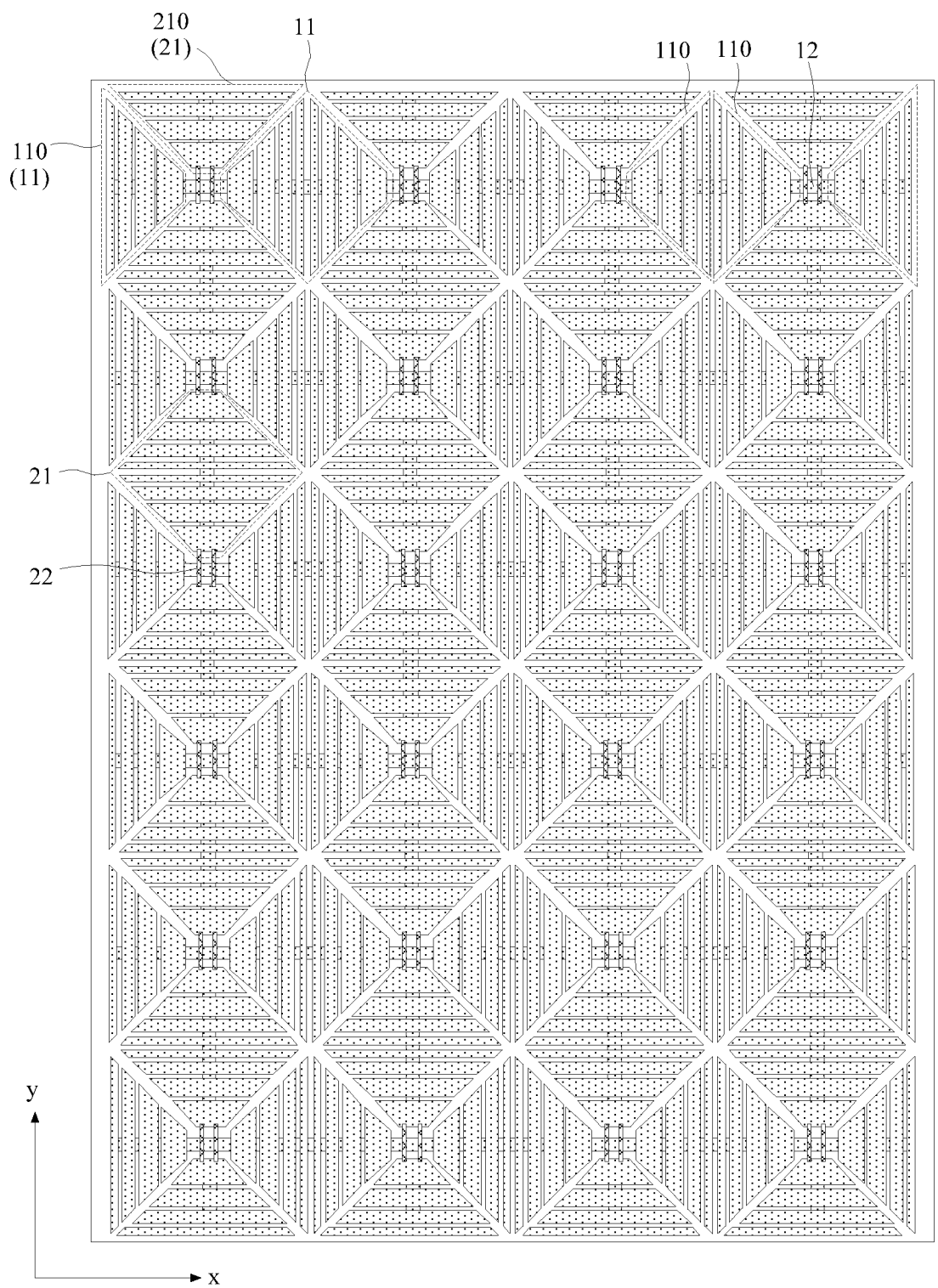
FIG. 2 is a schematic view of a touch display panel according to an embodiment of the present disclosure.

In view of the above circumstances, a touch display panel is provided according to an embodiment of the present disclosure. FIG. 2 illustrates a schematic view of a touch display panel according to an embodiment of the present disclosure. The touch display panel includes a plurality of first touch electrode units and a plurality of second touch electrode units. Each of the first touch electrode units includes first touch electrodes 11 and first connection portions 12 alternately arranged in a first direction x. Each of the first connection portions 12 is configured to connect two adjacent first touch electrodes 11 with each other. The plurality of first touch electrode units is arranged in a second direction y. Each of the second touch electrode units includes second touch electrodes 21 and second connection portions 22 alternately arranged in the second direction y. Each of the second connection portions 22 is configured to connect two adjacent second touch electrodes 21 with each other. The plurality of second touch electrode units is arranged in the first direction x.

In some embodiments of the present disclosure, each of the first touch electrodes 11 includes at least one first touch electrode sub-unit, each of which includes a plurality of first electrode sub-groups. The plurality of first electrode sub-groups is arranged in the first direction x. Each of the first electrode sub-groups includes at least one first sub-electrode extending in the second direction y. In one of the at least one first touch electrode sub-unit, the first sub-electrodes of two adjacent first electrode sub-groups have lengths gradually increasing in a direction from one of the first connection portions closest to the first touch electrode sub-unit to the first touch electrode sub-unit, and widths gradually decreasing in the direction from the one of the first connection portions closest to the first touch electrode sub-unit to the first touch electrode sub-unit. A length direction of the first sub-electrode is parallel to the second direction y, and a width direction of the first sub-electrode is perpendicular to the second direction y.

Figure 3:
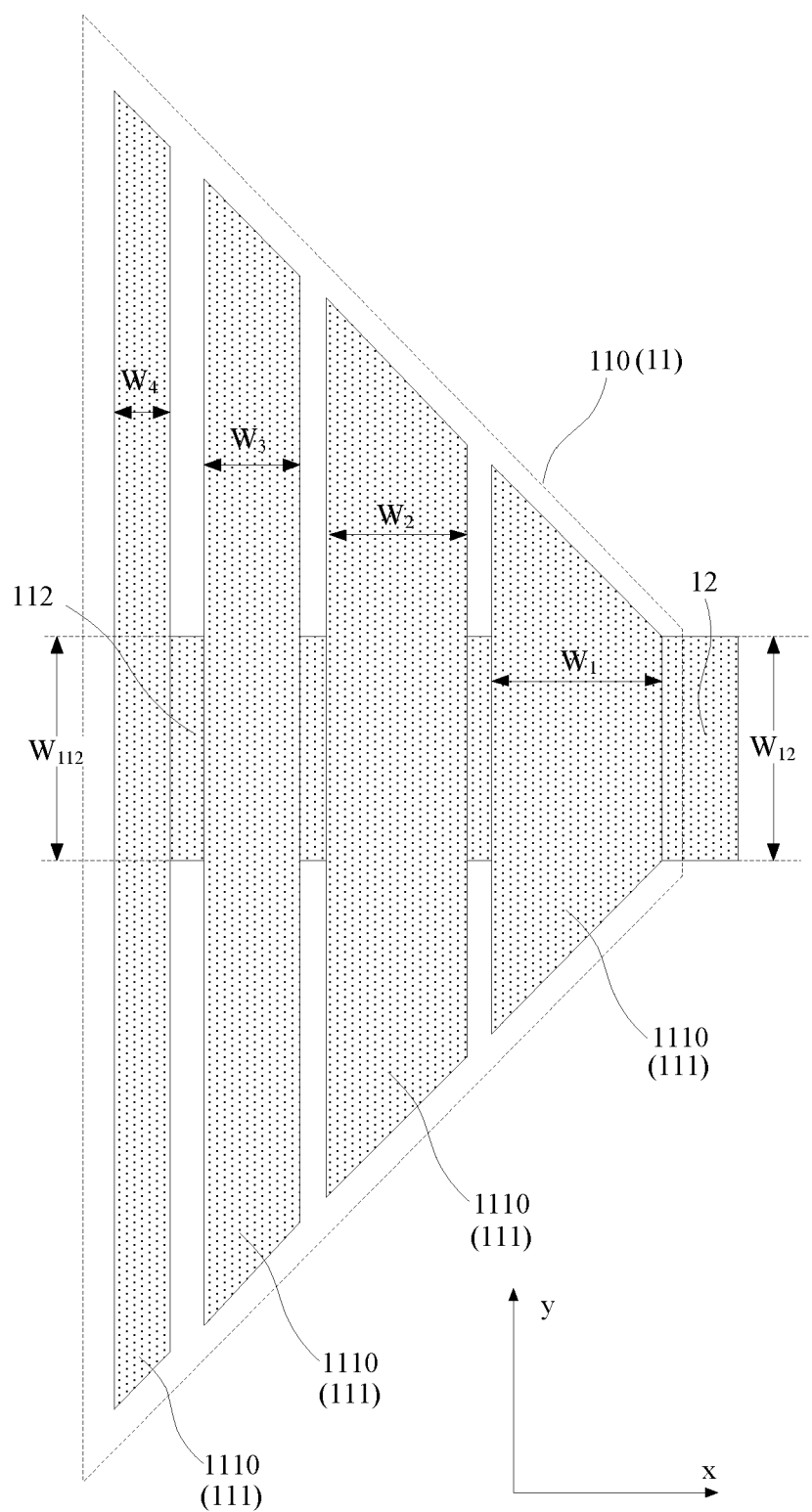
FIG. 3 is a schematic enlarged view of a first touch electrode according to an embodiment of the present disclosure.
Figure 4:
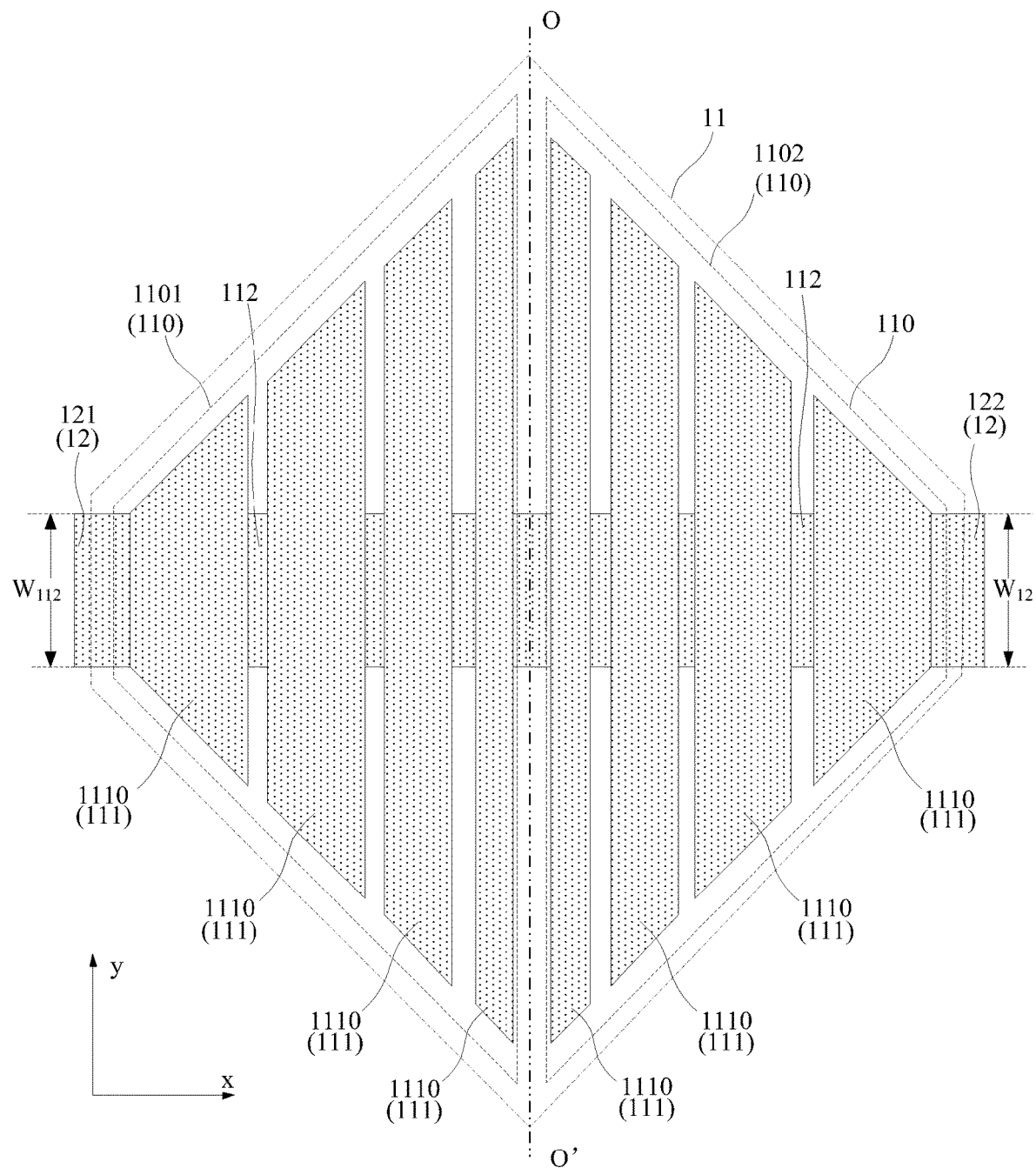
FIG. 4 is a schematic enlarged view of another first touch electrode according to an embodiment of the present disclosure.

For example, FIGS. 3 and 4 are schematic enlarged views of two different first touch electrodes according to embodiments of the present disclosure, respectively. FIG. 3 illustrates that the first touch electrode 11 includes one first touch electrode sub-unit 110 that includes four first electrode sub-groups 111, and each of the first electrode sub-groups 111 includes one first sub-electrode 1110. FIG. 4 illustrates that the first touch electrode 11 includes two first touch electrode sub-units 110, each of the two first touch electrode sub-units 110 includes four first electrode sub-groups 111, and each of the first electrode sub-groups 111 includes one first sub-electrode 1110.

In FIG. 3, the four first electrode sub-groups 111 are arranged in the first direction x, and the first sub-electrode 1110 of each of the four first electrode sub-groups 111 extends in the second direction y. Further, the first sub-electrodes 1110 of two adjacent first electrode sub-groups 111 have lengths gradually increasing in a direction from one of the first connection portions 12 to the first touch electrode 11, and widths gradually decreasing in the direction from the one of the first connection portions 12 to the first touch electrode 11.

In FIG. 4, the first touch electrode 11 includes two first touch electrode sub-units 110 arranged in the first direction x. Further, each of the two first touch electrode sub-units 110 includes four first electrode sub-groups 111. Furthermore, all the four first electrode sub-groups 111 of the two first touch electrode sub-units 110 are arranged in the first direction x. Each of the two first touch electrode sub-units 110 is connected with one first connection portion 12. The first touch electrode sub-unit at the left side in FIG. 4 is indicated by the reference numeral 1101, and the first touch electrode sub-unit at the right side in FIG. 4 is indicated by the reference numeral 1102, to clearly illustrate the embodiment of the present disclosure. Further, the first connection portion at the left side in FIG. 4 is indicated by the reference numeral 121, and the first connection portion at the right side in FIG. 4 is indicated by the reference numeral 122. A distance between the first connection portion 121 and the first touch electrode sub-unit 1101 is smaller than a distance between the first connection portion 121 and the first touch electrode sub-unit 1102, and a distance between the first connection portion 122 and the first touch electrode sub-unit 1102 is smaller than a distance between the first connection portion 122 and the first touch electrode sub-unit 1101. In FIG. 4, in any one of the first touch electrode sub-units, the first sub-electrodes 1110 of two adjacent first electrode sub-groups 111 have lengths gradually increasing in a direction from one of the first connection portions closest to the first touch electrode sub-unit to the first touch electrode sub-unit and widths gradually decreasing in the direction from one of the first connection portions closest to the first touch electrode sub-unit to the first touch electrode sub-unit. That is, in the first touch electrode sub-unit 1101, the first sub-electrodes 1110 of the two adjacent first electrode sub-groups 111 have lengths gradually increasing in a direction from one of the first connection portions 121 to the first touch electrode sub-unit 110, and widths gradually decreasing in the direction from one of the first connection portions 121 to the first touch electrode sub-unit 1101. Further, in the first touch electrode sub-unit 1102, the first sub-electrodes 1110 of the two adjacent first electrode sub-groups 111 have lengths gradually increasing in a direction from one of the first connection portions 122 to the first touch electrode sub-unit 1102, and widths gradually decreasing in the direction from the one of the first connection portions 122 to the first touch electrode sub-unit 1102.

In an exemplary embodiment of the present disclosure, in a case that the first touch electrode includes two first touch electrode sub-units, the two first touch electrode sub-units may have the same or different patterns. For example, the two first touch electrode sub-units may be configured to have the same pattern and be arranged axially symmetrically about a virtual symmetric axis OO', as shown in FIG. 4.

When the touch display panel is touch-operated, the first touch electrode units may be used as touch drive electrodes, and the second touch electrode units may be used as touch sensing electrodes. Alternatively, the second touch electrode units may be used as the touch drive electrodes, and the first touch electrode units may be used as the touch sensing electrodes, which are not limited herein.

In the touch display panel according to some embodiments of the present disclosure, the first touch electrode 11 is configured in an optimized shape. Specifically, the first touch electrode 11 is provided with the at least one first touch electrode sub-unit 110, and one of the at least one first touch electrode sub-unit 110 is provided with the plurality of first electrode sub-groups 111. Further, each of the first electrode sub-groups 111 includes at least one first sub-electrode 1110. In any one of the first touch electrode sub-units 110, in the direction along which the first connection portion 12 closest to the first touch electrode sub-unit 110 directs toward the first touch electrode sub-unit 110, the first sub-electrode 1110 of the former first electrode sub-group 111 of the two adjacent first electrode sub-groups 111 has a length that is smaller than a length of the first sub-electrode 1110 of the later first electrode sub-group 111, i.e., the lengths of the first sub-electrodes 1110 of the two adjacent first electrode sub-groups 111 are gradually increased in the second direction y. Therefore, the shape of the first touch electrode 11 matches with the shape of the second touch electrode 21, such that the first touch electrodes 11 and the second touch electrodes 21 covers a display region of the touch display panel, thereby reducing or even eliminating a touch blind spot in the touch display panel.

Furthermore, in some embodiments of the present disclosure, the widths of the first sub-electrodes of the two adjacent first electrode sub-groups 111 in the same first touch electrode sub-unit 110 decrease as the distances between the first sub-electrodes and the first connection portion 12 closest to first touch electrode sub-unit 110 increase. Therefore, the area of the touch blind spot region can be reduced by changing the lengths of the first sub-electrodes 1110 as described above. Further, the two adjacent first electrode sub-groups 111 have the same resistance, which can improve uniformity of the resistance at different positions in the first touch electrode 11, reduce the number of weak electrostatic portions of the first touch electrode 11, increase the antistatic breakdown capability of the first touch electrode 11, and improve reliability of the first touch electrode 11.

In an exemplary embodiment of the present disclosure, the lengths and widths of the first sub-electrodes 1110 of any two adjacent first electrode sub-groups 111 in the same first touch electrode sub-unit 110 may be configured as described above, so that the first touch electrode 11 has a structure as shown in FIG. 3 or FIG. 4. That is, in any one of the first touch electrode sub-units 110 in the first touch electrodes 11, the first sub-electrodes 1110 of the plurality of first electrode sub-groups 111 have the gradually increasing length and the gradually decreasing width in the direction from the one of the first connection portions 121 closest to the first touch electrode sub-unit 110 to the first touch electrode sub-unit 110. In this way, the plurality of first electrode sub-groups 111 in the same first touch electrode sub-unit 110 have the same resistance. Further, in this embodiment of the present disclosure, the first touch electrode sub-unit 110 is provided with the plurality of first electrode sub-groups 111, and the lengths and widths of the first sub-electrodes 1110 of the first electrode sub-groups 111 are adjustable. Accordingly, the plurality of first electrode sub-groups 111 can have the same resistance, and the uniformity of resistance at different positions in the first touch electrode including the plurality of first electrode sub-groups 111 can be improved, which increases the antistatic breakdown capability of the first touch electrode 11.

In addition, as shown in FIGS. 3 and 4, in this embodiment of the present disclosure, a length of the first connection portion 12 in the second direction y is smaller than or equal to that of the first touch sub-electrode closest to the first connecting portion in the second direction y. With this configuration, the first connection portion 12 has a relatively short length. Therefore, while ensuring that the touch display panel has excellent touch performance, the visibility of the first connection portion 12 can be reduced, so that the display effect of the touch display panel will not be affected.

Alternatively, as shown in FIGS. 3 and 4, for the first sub-electrode 1110 adjacent to the first connection portion 12, in the direction along which the first connection portion 12 directs toward the first sub-electrode 1110, the first sub-electrode 1110 has a gradually increasing length in the second direction y, and the shortest length of the first sub-electrode 1110 in the second direction y is the same as a length of the first connection portion 12 at a position close to the first sub-electrode 1110. With this configuration, a boundary between the first connection portion 12 and the first touch electrode 11 is smoothly transited in the second direction y, thereby avoiding rapid change to reduce the resistance change at the boundary. Therefore, when static electricity is transmitted from the first touch electrode 11 to the first connection portion 12, the static electricity can be prevented from being accumulated at the boundary, thereby reducing probability that the boundary is electrostatically broken and further increasing the antistatic breakdown capability of the first touch electrode unit.

Figure 5:
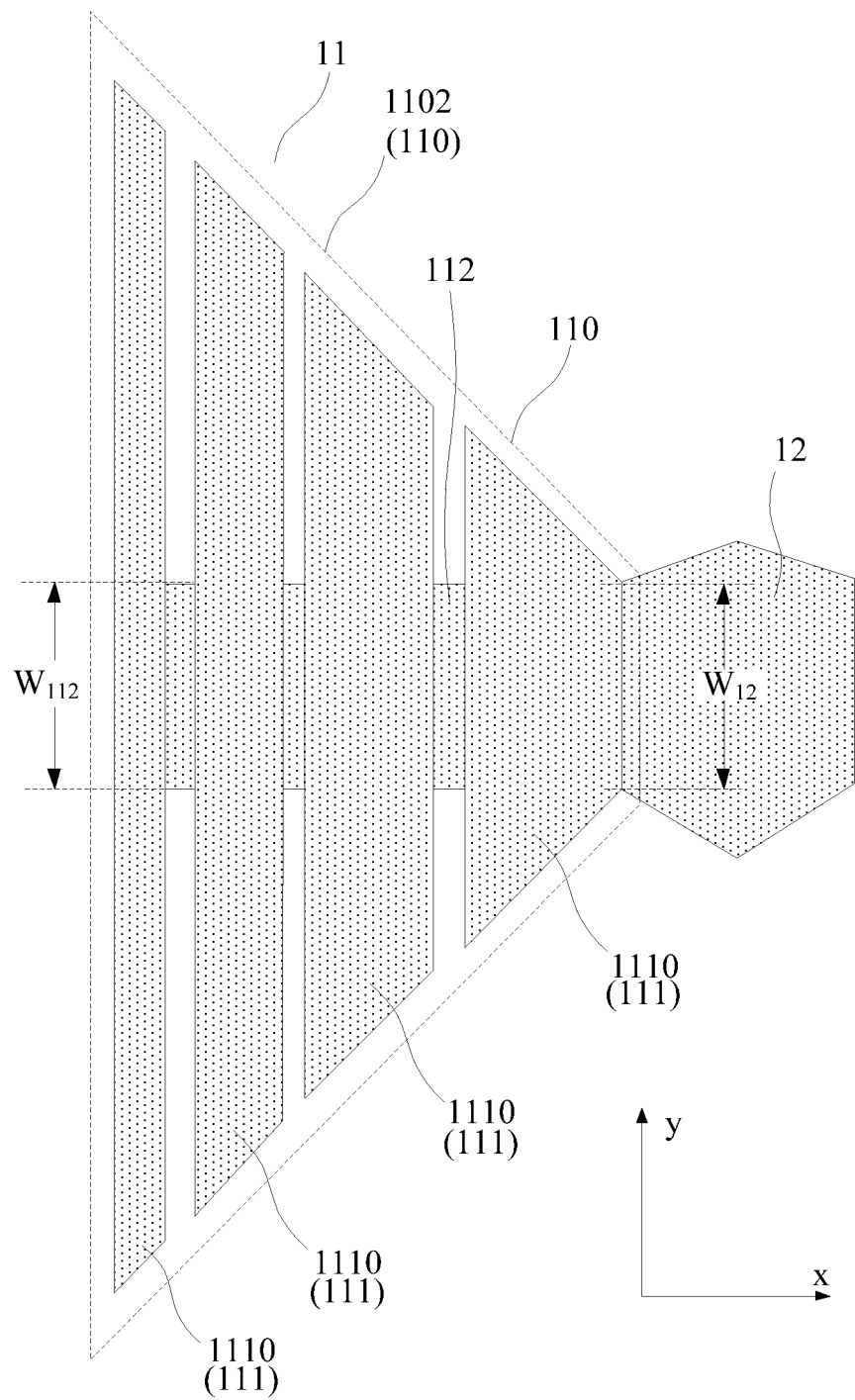
FIG. 5 is a schematic view of a further another first touch electrode and a first connection portion according to an embodiment of the present disclosure.

It should be noted that in the structure illustrated in FIGS. 3 and 4, the first connection portion 12 has a regular quadrilateral shape with the same width. The first connection portion 12 may be configured to have an irregular shape with different widths at different positions, as shown in FIG. 5. FIG. 5 illustrates a schematic view of a further another first touch electrode and another first connection portion according to an embodiment of the present disclosure, and the first connection portion 12 has a shape in which a width of a middle portion of the first connection portion 12 is greater than that of both sides thereof.

In an exemplary embodiment of the present disclosure, the first touch electrode further includes inter-group connection portions, each of which is located between two adjacent first electrode sub-groups. The inter-group connection portion is configured to allow a touch signal to be transmitted between the two adjacent first electrode sub-groups, so as to ensure that the first touch electrodes transmit the touch signal as an electrically connected integrated piece. For example, in FIGS. 3 and 4, one inter-group connection portion 112 is illustratively arranged between the two adjacent first electrode sub-groups 111 to connect the two first electrode sub-groups 111 adjacent to each other in the first direction x.

As shown in FIGS. 3 to 5, a width $W_{112}$ of each of the inter-group connection portions 112 is equal to a width $W_{12}$ of the first connection portion 12. The above "a width $W_{112}$ of each of the inter-group connection portion 112 is equal to a width $W_{12}$ of the first connection portion 12" means that the width $W_{12}$ of the first connection portion 12 at a position close to the first touch electrode 11 is equal to the width of the inter-group connection portion 112. In addition, the inter-group connection portion 112 has a width direction perpendicular to a direction along which a current is transmitted through the inter-group connection portion 112. Further, in a plane parallel to the touch display panel, the width direction of the first connection portion 12 is perpendicular to a direction along which the current is transmitted through the first connection portion 12. In this embodiment of the present disclosure, the width of the inter-group connection portion 112 is configured to be same as that of the first connection portion 12, so that the uniformity of the resistance at different positions in the first touch electrode unit is further improved.

Figure 6:
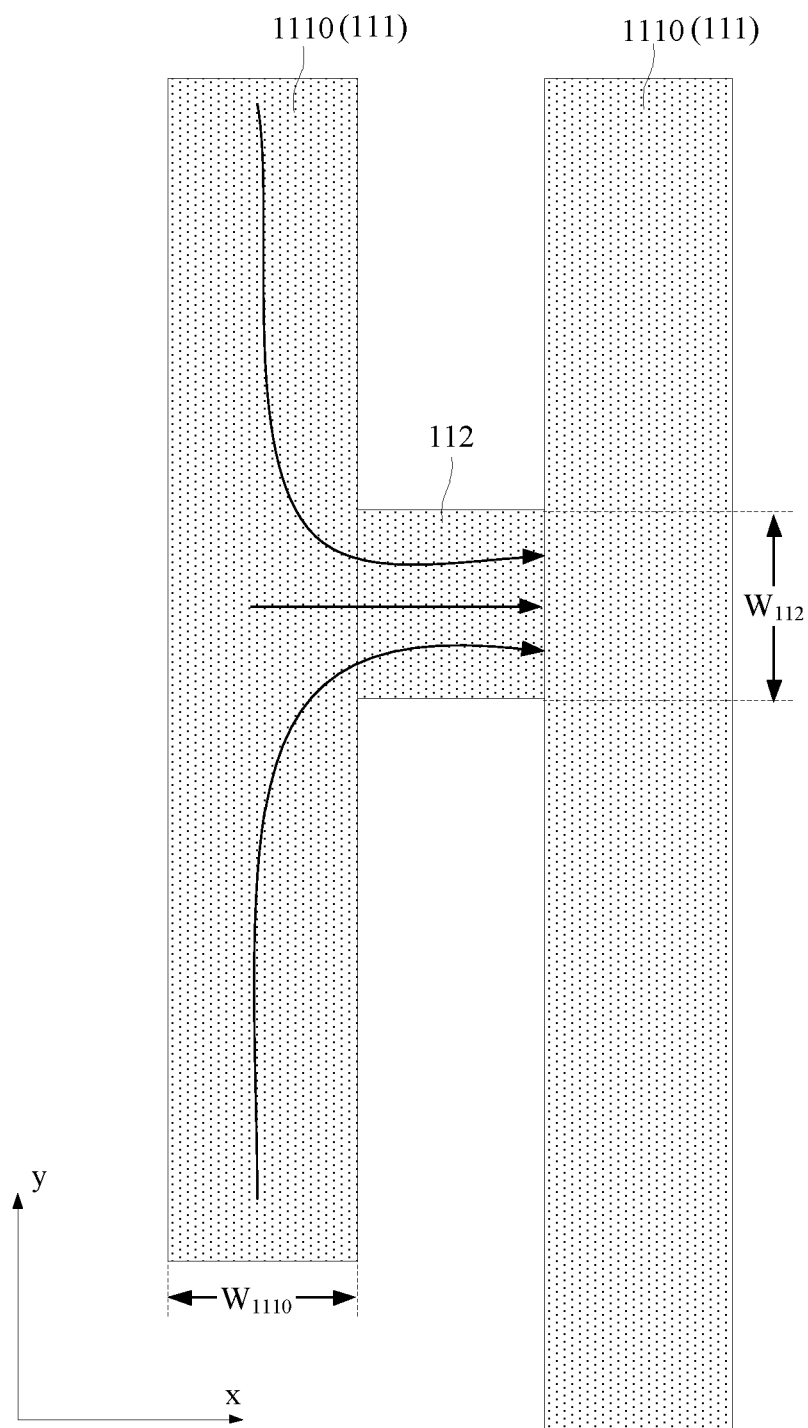
FIG. 6 is a schematic view showing that a current is transmitted between two adjacent first sub-electrodes of two adjacent first sub-electrode groups, according to an embodiment of the present disclosure.

FIG. 6 illustrates a schematic view showing that the current is transmitted between two adjacent first sub-electrodes 1110 of two adjacent first electrode sub-groups 111. When the current flows through the inter-group connection portion 112 in a current direction indicated by the arrows shown in FIG. 6 as an example, the width direction of the inter-group connection portion 112 is perpendicular to the current direction shown in FIG. 6 in the plane parallel to the touch display panel.

Figure 7:
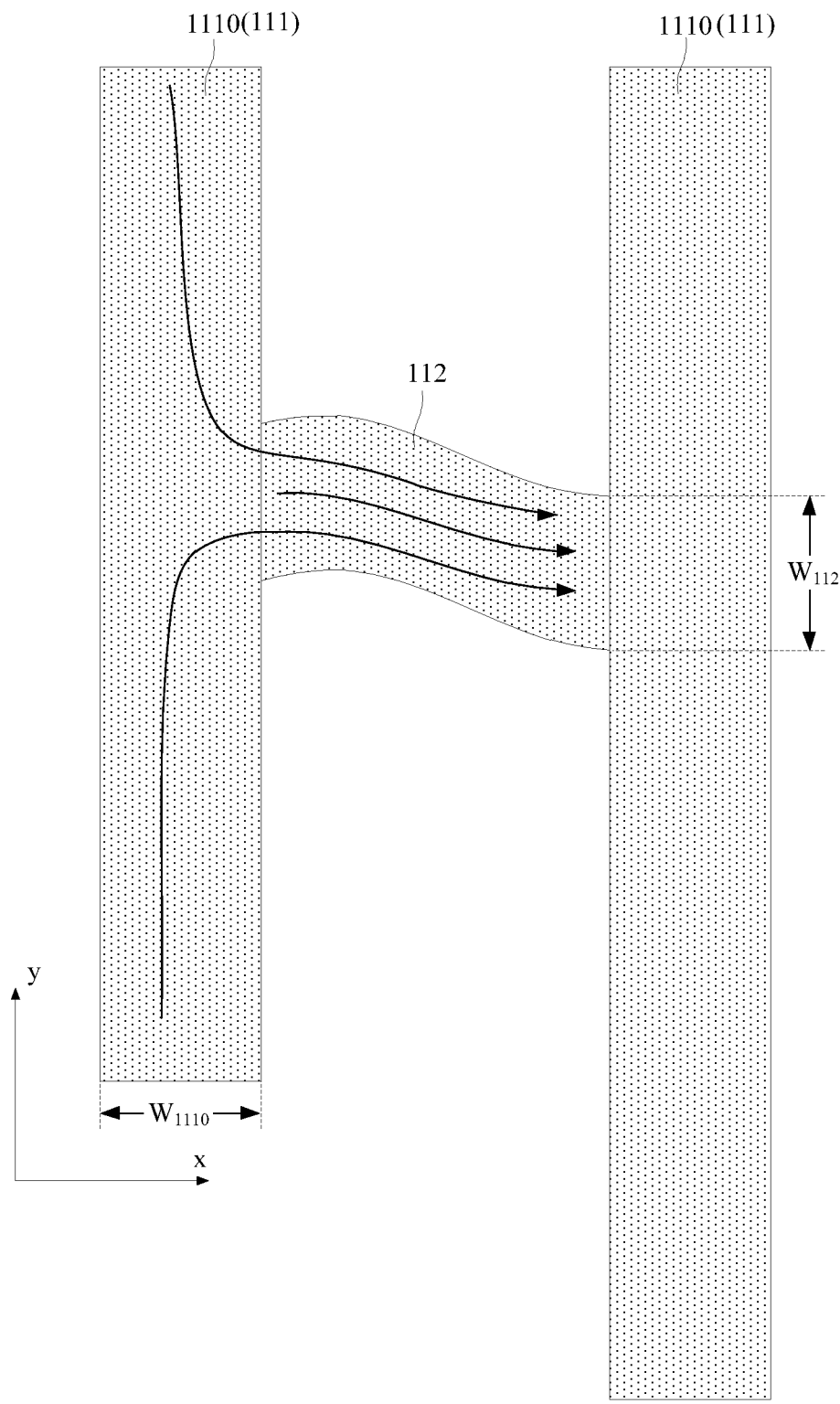
FIG. 7 is another schematic view showing that the current is transmitted between the two adjacent first sub-electrodes of the two adjacent first sub-electrode groups, according to an embodiment of the present disclosure.

It should be understood that the shape of the inter-group connection portion 112 shown in FIGS. 3 to 6 is only illustrative. In the actual configuration of the first touch electrode, the inter-group connection portion 112 may be configured to have different shapes from those shown in FIGS. 3 to 6 as desired. In some embodiments of the present disclosure, the inter-group connection portion 112 may be configured to, for example, have a non-linear shape as shown in FIG. 7. FIG. 7 illustrates another schematic view showing that the current is transmitted between two adjacent first sub-electrodes of two adjacent first electrode sub-groups.

Figure 8:
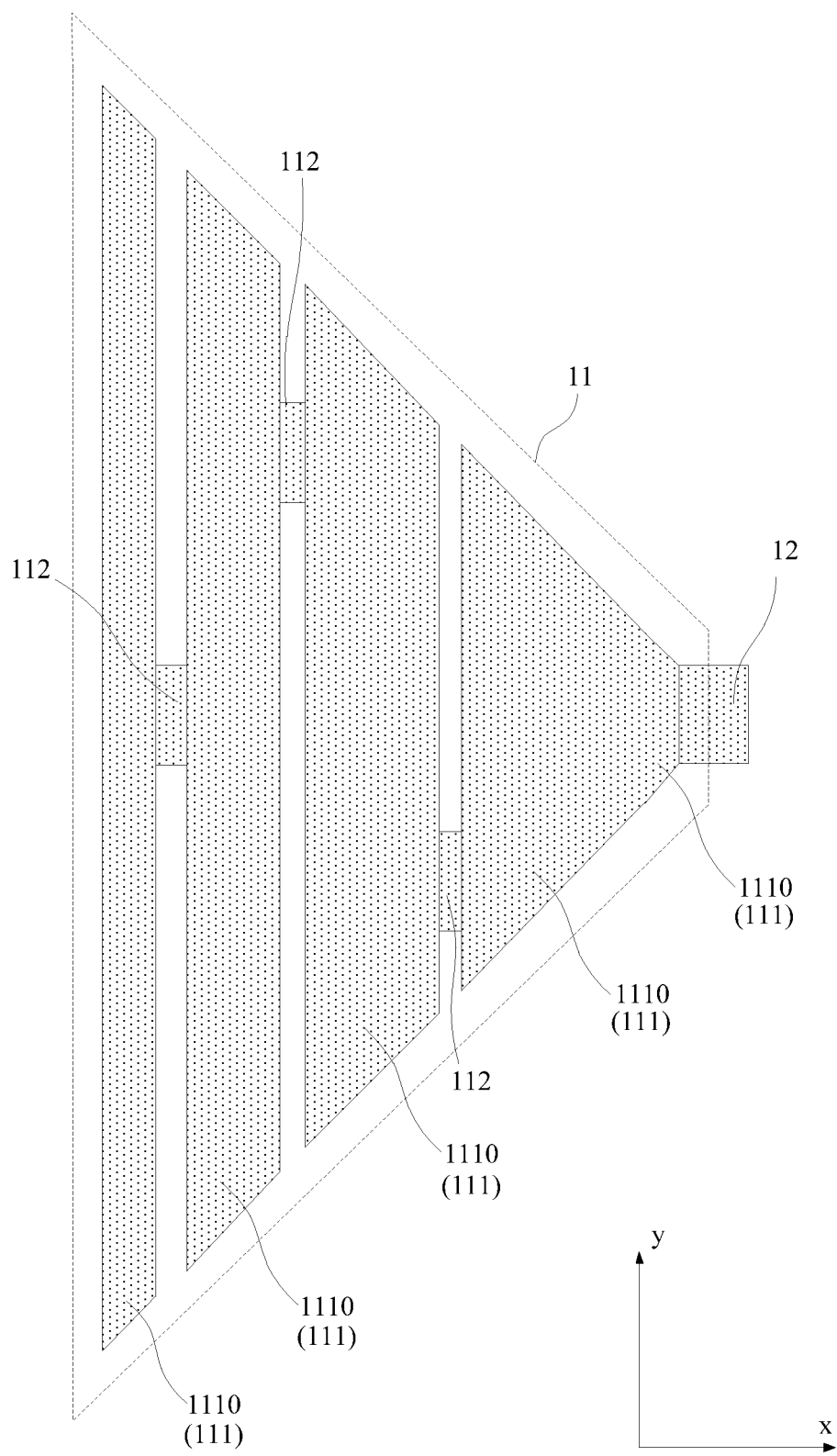
FIG. 8 is a schematic view of a yet another first touch electrode according to an embodiment of the present disclosure.

Alternatively, FIG. 8 shows a schematic view of a yet another first touch electrode according to an embodiment of the present disclosure. In this embodiment, two adjacent inter-group connection portions 112 are staggered in the first direction x. With this arrangement, when the static electricity is transmitted inwardly from the edges of the first touch electrode 11 to the first connection portion 12, as compared with the arrangement in which the two adjacent inter-group connection portions 112 are aligned with each other in the first direction x, the arrangement shown in FIG. 8 can change a transmission path of the static electricity from the edges of the first touch electrode 1 to the first connection portion 12. Accordingly, the transmission path of the static electricity from the edges of the first touch electrode 1 to the first connection portion 12 is extended, so as to further reduce the probability that the first connection portion 12 with the relatively large resistance is electrostatically broken, thereby further increasing the anti-static breakdown capability of the first touch electrode unit.

Figure 9:
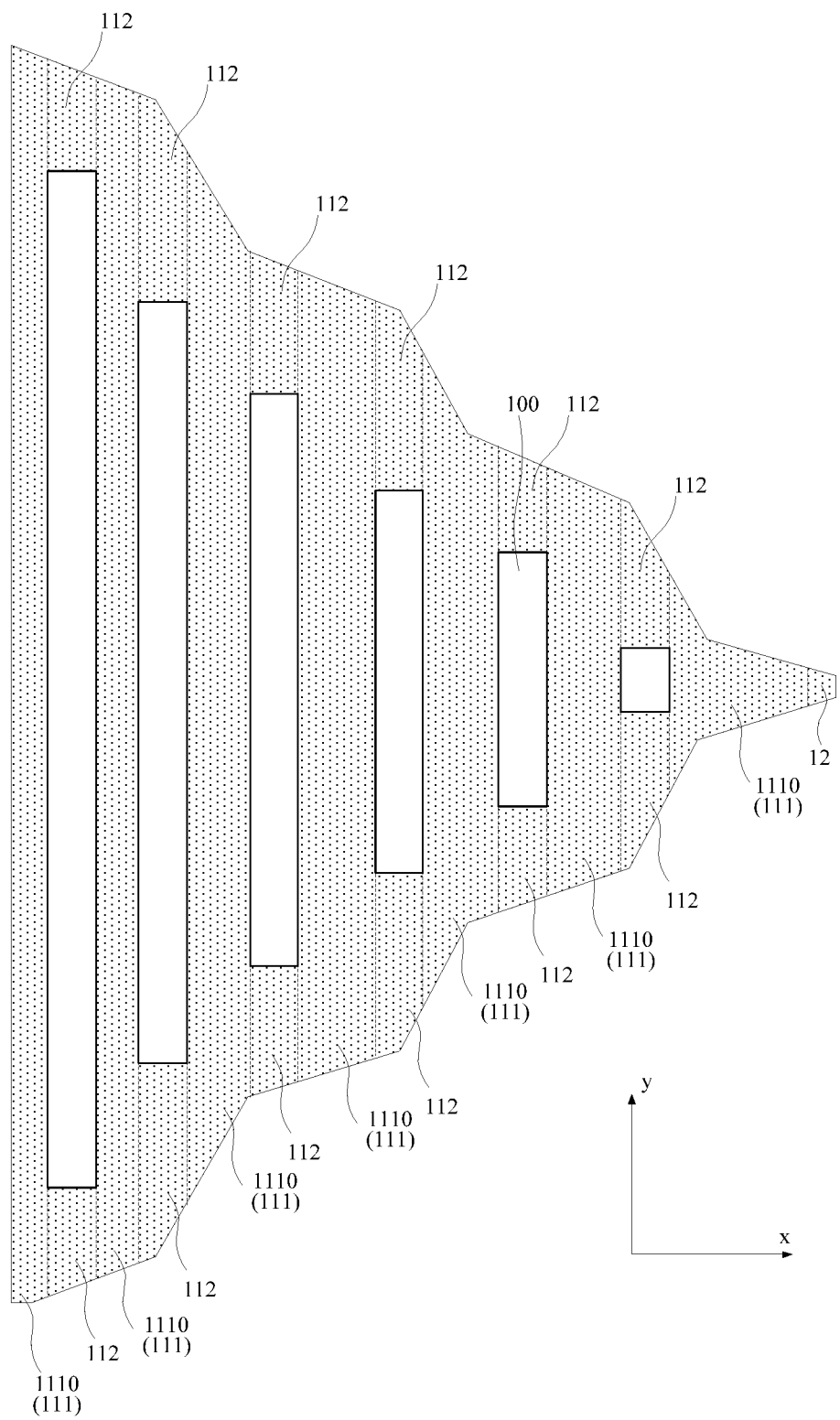
FIG. 9 is a schematic view of a still another first touch electrode according to an embodiment of the present disclosure.

The structure of the first touch electrode is described above when taking an embodiment in which one inter-group connection portion is arranged between two adjacent first electrode sub-groups as an example. In another embodiment of the present disclosure, at least two inter-group connection portions are arranged between two adjacent electrode sub-groups 111. In an exemplary embodiment of the present disclosure, FIG. 9 shows a schematic view of a still another first touch electrode according to an embodiment of the present disclosure, in which two inter-group connection portions 112 are arranged between two adjacent first electrode sub-groups 111. In the embodiment shown in FIG. 9, the first touch electrode 11 further includes hollow portions 100. Each of the hollow portions 100 is located between two adjacent first electrode sub-groups 111 in the first direction x. The inter-group connection portions 112 and the hollow portions 100 are arranged in the second direction y. Further, each of the hollow portions 100 is located between two adjacent inter-group connection portions 112 in the second direction y. That is, the hollow portions 100 are located inside the first touch electrode 11, and are surrounded by the inter-group connection portions 112 and the first sub-electrodes 1110. In the embodiment shown in FIG. 9, the two adjacent first electrode sub-groups 111 are divided by dotted lines.

Referring to FIG. 9, lengths of two adjacent hollow portions 100 in the second direction y gradually increases in the direction from the first connection portion 12 to the first touch electrode. With this configuration, the resistance at different positions in the first touch electrode 11 can be uniformed. Further, in some embodiments of the present disclosure, the hollow portions 100 are provided inside the first touch electrode 11 such that at least two inter-group connection portions 112 are connected to two opposite edges of two adjacent first sub-electrode 1110 in the second direction y, respectively. After being transmitted to the edges of the first sub-electrode 1110, the static electricity can be transferred through the inter-group connection portions 112. With this configuration, the static electricity is prevented from being accumulated at the edges of the first sub-electrode 1110, which further increases the anti-static breakdown capability of the first touch electrode.

In some embodiments of the present disclosure, the first electrode sub-groups may be configured in several ways. As shown in FIGS. 2, 3, 4, 7 and 8, one first electrode sub-group 111 includes only one first sub-electrode 1110.

In an exemplary embodiment of the present disclosure, in the case where one first electrode sub-group 111 is provided with only one first sub-electrode 1110, the lengths of the plurality of first sub-electrodes 1110 in the first direction x are arranged based on an arithmetic sequence in the direction along which the first connection portion 12 directs toward the first touch electrode sub-unit. Taking the four first sub-electrodes 1110 shown in FIG. 3 as an example, in the direction along which the first connection portion 12 directs toward the first touch electrode 11, the widths of the four first sub-electrodes 1110 are defined as $W_1$, $W_2$, $W_3$, and $W_4$, respectively, wherein $W_1-W_2=W_2-W_3=W_3-W_4$.

Alternatively, in some embodiments of the present disclosure, the first electrode sub-group may include a plurality of first sub-electrodes. In an exemplary embodiment shown in FIG. 10 a schematic enlarged view of a further another first touch electrode according to an embodiment of the present disclosure is illustrated. As shown, each of the first electrode sub-groups 111 includes a plurality of first sub-electrodes 1110, each of which extends in the second direction y. Further, the plurality of first sub-electrodes 1110 are arranged in the first direction x, and the first sub-electrodes 1110 in the same first electrode sub-group 111 have the same width. With this arrangement, the same resistance can be maintained when the static electricity is transmitted among the plurality of first sub-electrodes 1110 in the same first electrode sub-group 111, to avoid electrostatic weak portions from being formed in a part of the first sub-electrodes 1110. Further, the consistency of the touch signal transmitted in the first electrode sub-groups 111 can be improved, thereby improving touch uniformity of the touch display panel.

Figure 10:
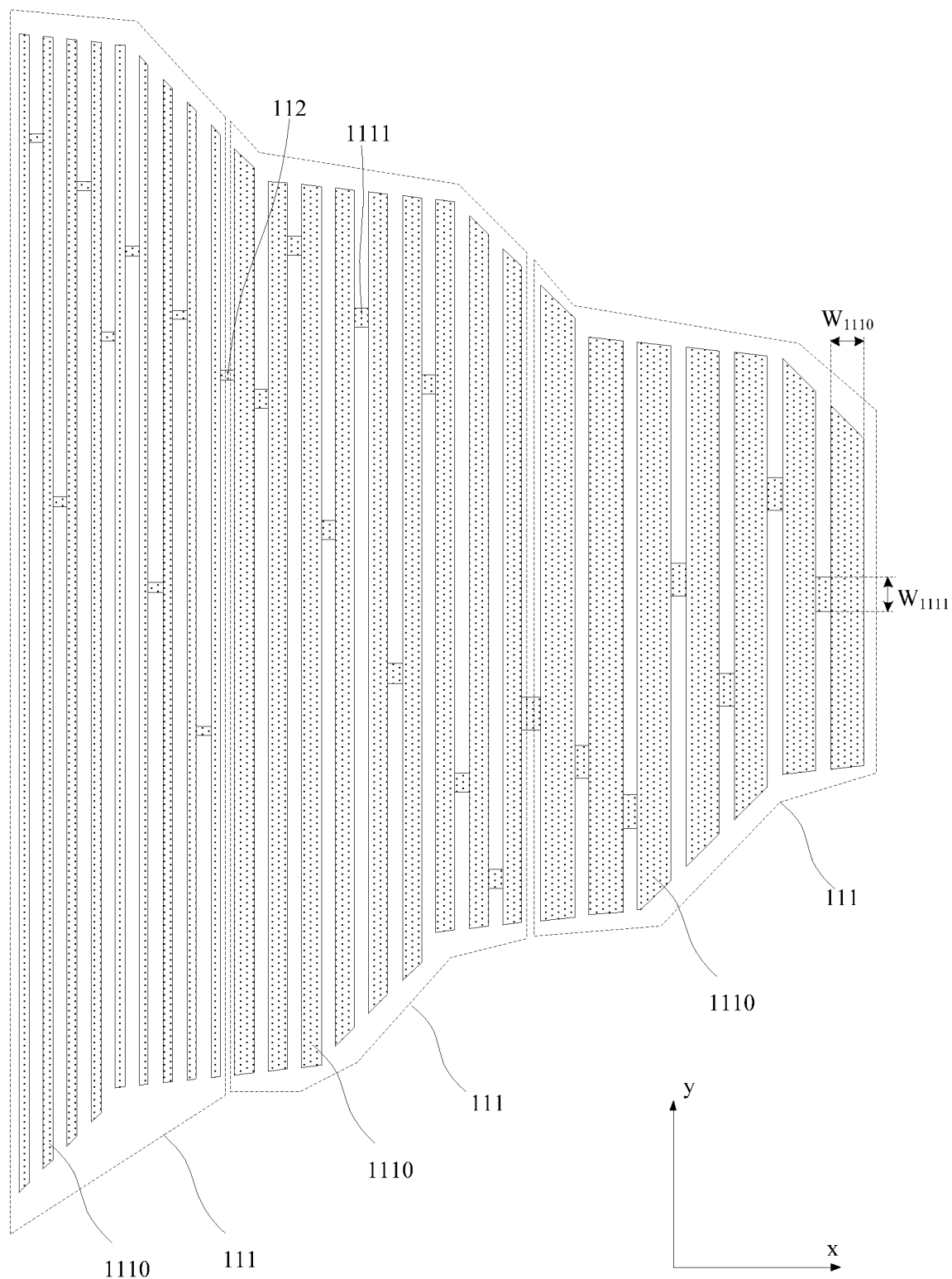
FIG. 10 is a schematic enlarged view of a further another first touch electrode according to an embodiment of the present disclosure.

In an exemplary embodiment shown in FIG. 10, one first electrode sub-group includes the plurality of first sub-electrodes. In the structure shown in FIG. 10, similar to the structures shown in FIGS. 3 and 4, the first touch electrode also includes inter-group connection portions 112, each of which is located between two adjacent first electrode sub-groups 111, to connect the two adjacent first electrode sub-groups 111 with each other.

Alternatively, as shown in FIG. 10, the width of the inter-group connection portion 112 is configured to be same as that of the first sub-electrode 1110 in any one of the first electrode sub-group 111 connected to the inter-group connection portion 112 in this embodiment. In the plane parallel to the touch display panel, the width direction of the inter-group connection portion 112 is perpendicular to the direction along which the current flows through the inter-group connection portion 112. With this arrangement, the same resistance can be maintained when the static electricity is transmitted between the two adjacent first electrode sub-groups 111 to avoid electrostatic weak portions from being formed. Further, the consistency of the touch signal transmitted in the two adjacent first electrode sub-groups 111 can be improved, thereby improving the touch uniformity of the touch display panel.

In an exemplary embodiment of the present disclosure, the first electrode sub-group 111 includes the plurality of first sub-electrodes 1110. With continued reference to FIG. 10, the first electrode sub-group 111 as described above further includes intra-group connection portions 1111, each of which is located between two adjacent first sub-electrodes 1110 to connect the two adjacent first sub-electrodes 1110 with each other. Each of the intra-group connection portions 1111 extends in a direction different from the extending direction of the first sub-electrodes 1110. The intra-group connection portions 1111 are configured to ensure that the first electrode sub-groups 111 including the intra-group connection portions 1111 are an electrically connected integrated piece. Therefore, normal transmission of the touch signal can be ensured so that the touch function of the touch display panel is not affected.

In an exemplary embodiment of the present disclosure, for the intra-group connection portion 1111 and the first sub-electrodes 1110 connected to the intra-group connection portion 111 in the same first electrode sub-group 111, a width $W_{1111}$ of the intra-group connection portion 1111 is configured to be equal to a width $W_{1110}$ of each of the first sub-electrodes 1110 in the first electrode sub-group 111. Further, in the plane parallel to the touch display panel, a width direction of each of the intra-group connection portions 1111 is perpendicular to a direction along which the current flows through the intra-group connection portion 1111. Specifically, the width direction of the intra-group connection portion 1111 is defined in a same way as the inter-group connection portion 112 shown in FIG. 6, and the detailed description thereof will be omitted herein.

In this embodiment of the present disclosure, the width of the intra-group connection portion 1111 is equal to that of the first sub-electrode 1110. On one hand, the same resistance can be maintained when the static electricity is transmitted between the two adjacent first sub-electrodes 1110 in the same first electrode sub-group 111, to avoid the electrostatic weak portions from being formed in the same first electrode sub-group 111. On the other hand, the consistency of the touch signal transmitted between the two adjacent first sub-electrodes 1110 in the same first electrode sub-group 111 can be improved, thereby improving the touch uniformity of the touch display panel.

In an exemplary embodiment of the present disclosure, the intra-group connection portions may be arranged in several ways. As shown in FIG. 10, only one intra-group connection portion is arranged between two adjacent first sub-electrodes 1110. In an exemplary embodiment of the present disclosure, two adjacent intra-group connection portions 1111 may be staggered in the first direction x. With this arrangement, when the static electricity is transmitted inwardly from the edges of the first touch electrode 11, compared with the arrangement in which the two adjacent intra-group connection portions 112 are aligned with each other in the first direction x, the arrangement shown in FIG. 10 can change the transmission path of the static electricity transmitted inwardly from the edges of the first touch electrode. Accordingly, the transmission path of the static electricity from the edges of the first touch electrode to the first connection portion is extended, to further reduce the probability that the first connection portion 12 with the relatively large resistance is electrostatically broken, thereby further increasing the anti-static breakdown capability of the first touch electrode unit.

Figure 11:
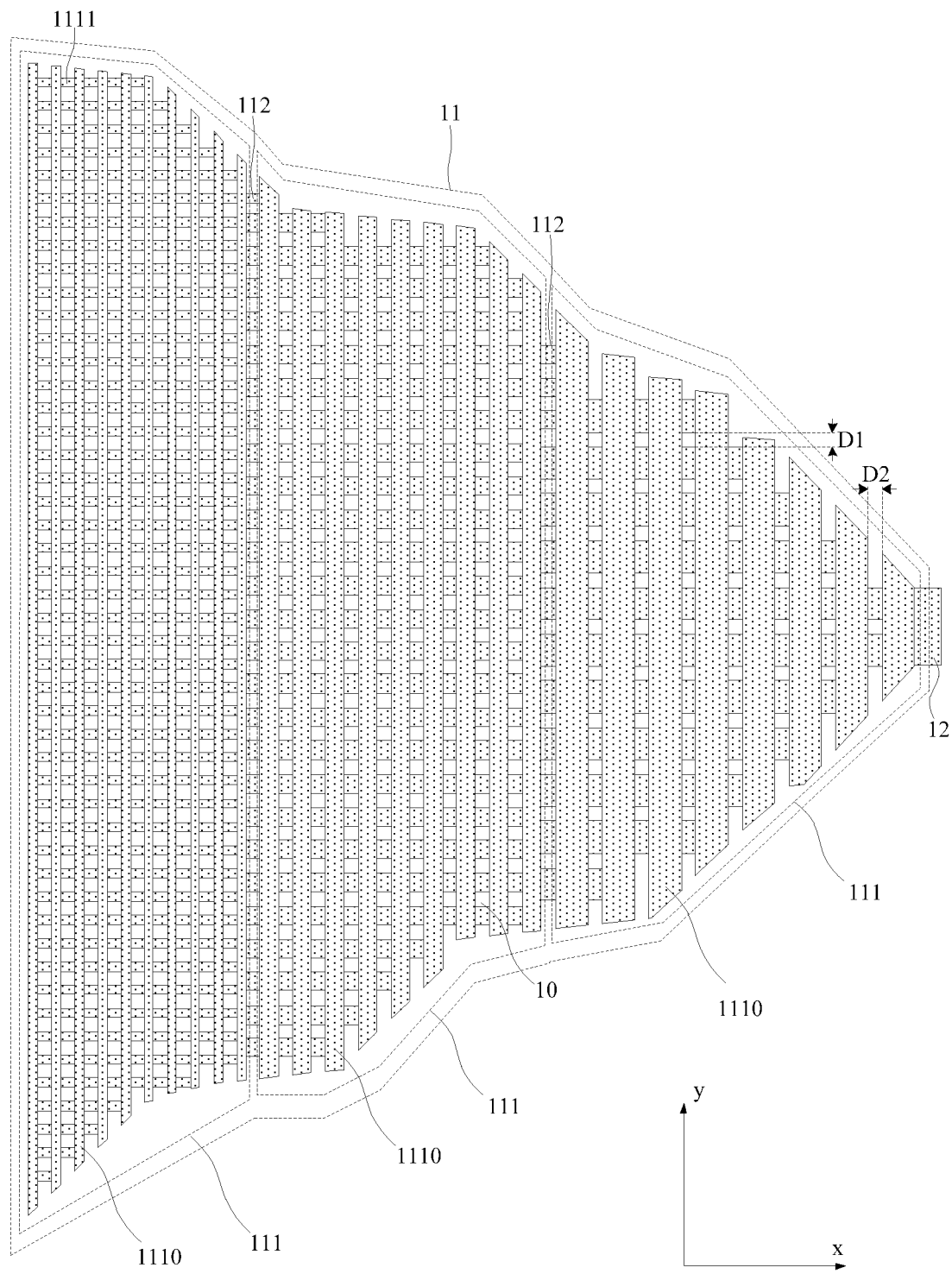
FIG. 11 is a schematic view of a yet another first touch electrode according to an embodiment of the present disclosure.

Alternatively, FIG. 11 illustrates a schematic view of a yet another first touch electrode according to an embodiment of the present disclosure. One of the first electrode sub-groups 111 may include a plurality of intra-group connection portions 1111 arranged between two adjacent first sub-electrodes 1110, and the plurality of intra-group connection portions 1111 are arranged in the second direction y. As shown in FIG. 11, each of the intra-group connection portion 1111 extends in a direction different from the extending direction of the first sub-electrodes 1110. The plurality of intra-group connection portions 1111 is configured to reduce the resistance of the first electrode sub-group 111, which facilitates reducing attenuation of the touch signal during transmission.

It should be noted that a distance between two adjacent first sub-electrodes 1110 in the first direction x and a distance between two adjacent intra-group connection portions 1111 in the second direction y is adjustable as desired. For example, as shown in FIG. 11, in the same first electrode sub-group 111, the distance between the two adjacent intra-group connection portions 111 is equal to the distance between the two adjacent first sub-electrodes 1110. The distance between the two adjacent intra-group connection portions 1111 refers to the shortest distance between edges of the two adjacent intra-group connection portions 1111, and the distance between the two adjacent first sub-electrodes 1110 refers to the shortest distance between edges of the two adjacent first sub-electrodes 1110. As shown in FIG. 11, in the first sub-electrode group 111 closest to the first connection portion 12, the distance between the two adjacent first sub-electrodes 1110 is defined as D2, and the distance between the two adjacent intra-group connection portions 1111 is defined as D1. In this arrangement, as shown in FIG. 11, a plurality of openings 10 of a quadrilateral shape are provided in the first touch electrode 11. Further, the openings 10 are surrounded by the first sub-electrodes 1110 and the intra-group connection portions 1111. Furthermore, a length of each opening 10 in the first direction x is the distance D2 between the two adjacent first sub-electrodes 1110, and a length of the opening 10 in the second direction y is the distance D1 between the two adjacent intra-group connection portions 1111. With this arrangement, while the uniformity of the resistance at different positions in the first touch electrode is improved, the uniformity of the patterns of the first touch electrodes at different positions can be improved to ensure that influences of the first touch electrodes at different positions on light emitted by sub-pixels tend to be the same, thereby ensuring that the touch display panel has a good display effect.

Figure 12:
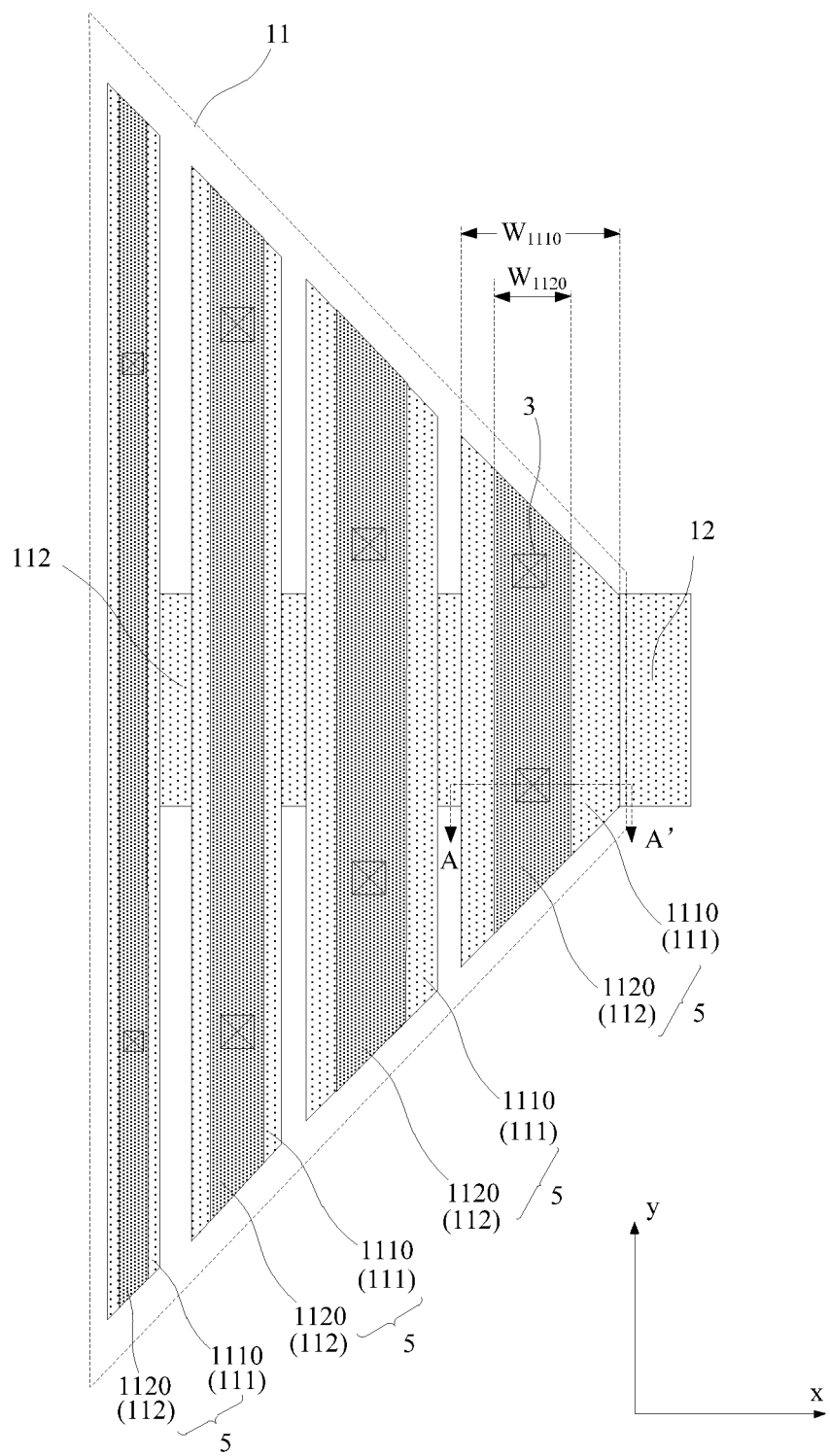
FIG. 12 is a schematic view of a still another first touch electrode according to an embodiment of the present disclosure.
Figure 13:
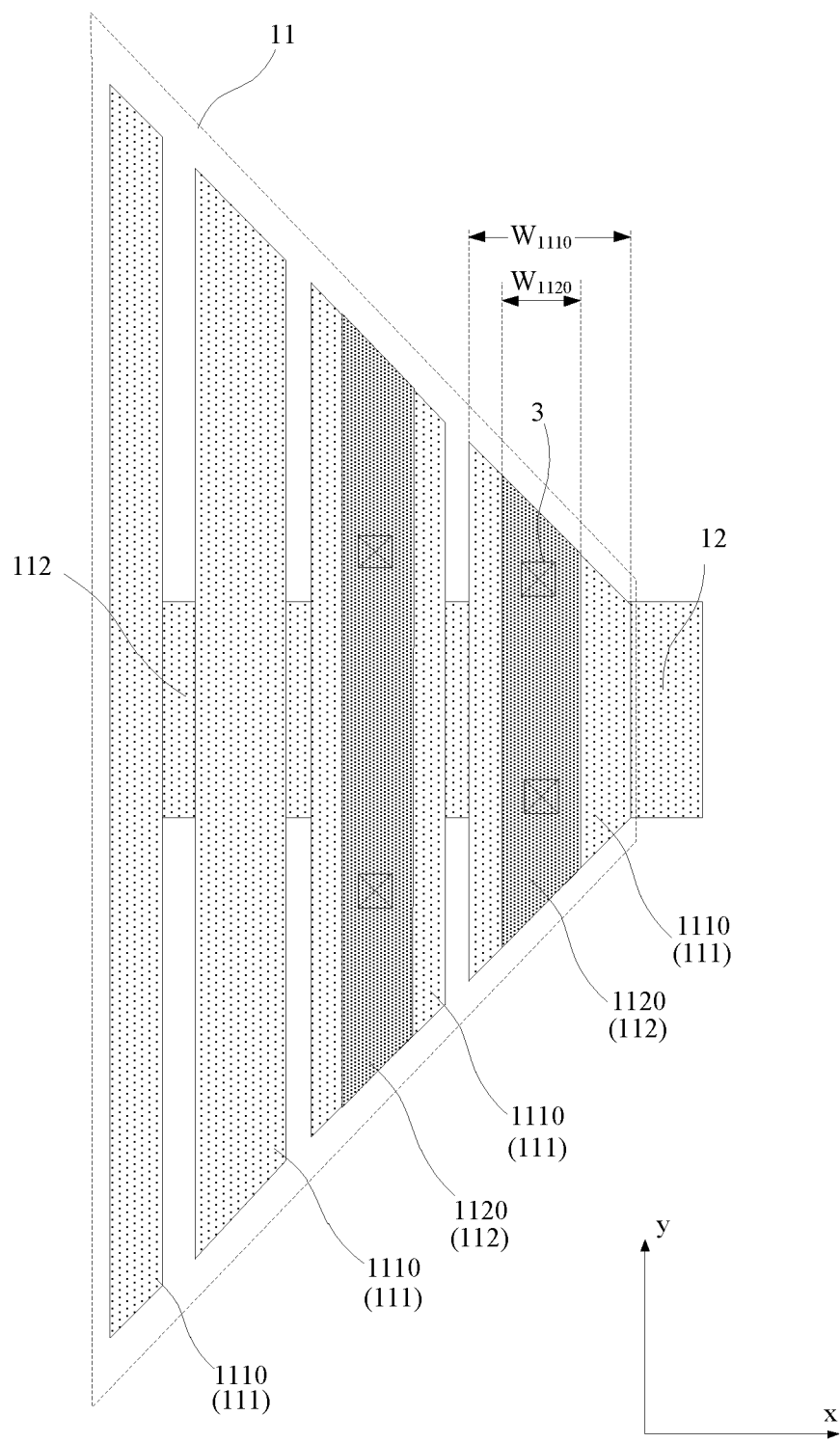
FIG. 13 is a schematic view of a further another first touch electrode according to an embodiment of the present disclosure.
Figure 14:
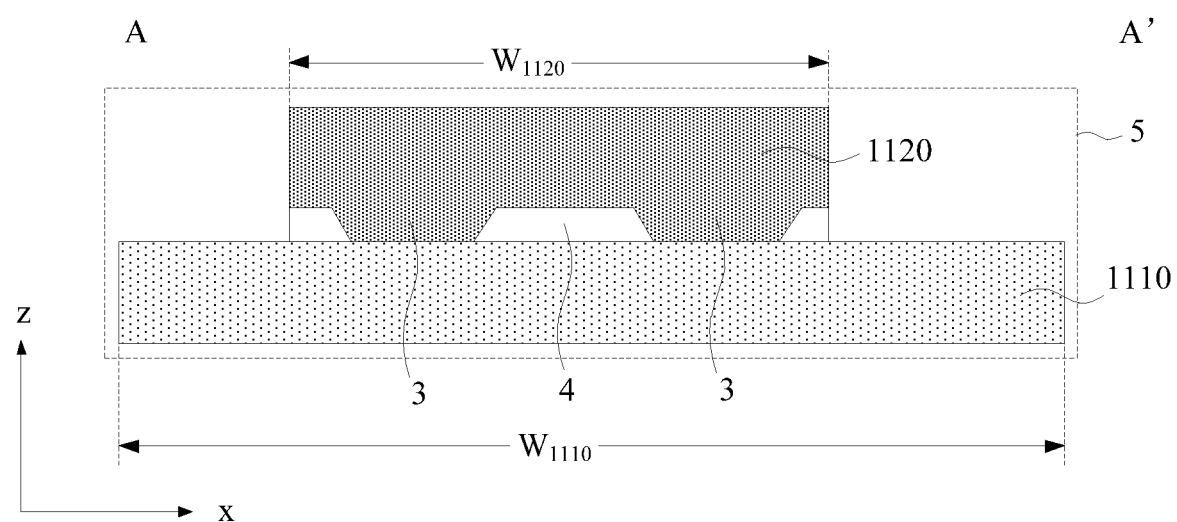
FIG. 14 is a schematic sectional view along line AA' in FIG. 12, according to an embodiment of the present disclosure.

In an exemplary embodiment of the present disclosure, the first touch electrode further includes M second electrode sub-groups, wherein M is an integer greater than or equal to 1. Each of the M second electrode sub-groups includes at least one second sub-electrode located on a different layer from the first sub-electrode. Alternatively, the number of the second electrode sub-groups is less than or equal to that of the first electrode sub-groups, and the second electrode sub-groups are connected to the at least one first electrode sub-group through vias. Referring to FIGS. 12 to 14, FIGS. 12 and 13 are schematic views of two other first touch electrodes according to embodiments of the present disclosure, and FIG. 14 is a schematic sectional view along line AA' in FIG. 12. Further, FIG. 12 illustrates that the number of the second electrode sub-groups is equal to that of the first electrode sub-groups, and M=4, i.e., the first touch electrode includes four second electrode sub-groups. FIG. 13 illustrates that the number of the second electrode sub-groups is less than that of the first electrode sub-groups. In some embodiments of the present disclosure, a spacing is formed between orthographic projections of the two adjacent second sub-electrodes 1120 on the plane of the touch display panel. The second electrode sub-group 112 is connected to at least one first electrode sub-group 111 through vias 3. The orthographic projection of each of the second sub-electrodes 1120 on the plane of the touch display panel overlaps with an orthographic projection of the corresponding first sub-electrode 1110 on the plane of the touch display panel.

In some embodiments of the present disclosure, as shown in FIGS. 12 and 13, in the case where the first touch electrode includes the plurality of second electrode sub-groups 112, the second sub-electrodes 1120 of the two adjacent second electrode sub-groups 112 have gradually increasing lengths and gradually decreasing widths in the direction from the first connection portion 12 to the first touch electrode 11. Further, the second sub-electrode 1120 has a length direction parallel to that of the first sub-electrode 1110 and a width direction parallel to that of the first sub-electrode 1110.

In some embodiments of the present disclosure, when the width and length of the first sub-electrode 1110 are configured as described above, if the resistances of the first sub-electrodes 1110 located at different positions are still different from each other, the first touch electrode 11 is additionally provided with the second sub-electrodes 1120, and the first sub-electrodes 1110 and the second sub-electrodes 1120 are connected with each other in the above-described manner, such that the first sub-electrode 1110 and the second sub-electrode 1120 that correspond to each other are arranged in parallel. With this arrangement, the resistances at the positions where the first sub-electrodes 1110 are located can be reduced as compared to the arrangement in which the first touch electrode 11 is only provided with the first sub-electrodes 1110. In this way, the resistances of the first touch electrodes 11 at different positions can be more consistent to further increase the antistatic capability of the first touch electrode 11. In addition, since the first sub-electrodes 1110 and the second sub-electrodes 1120 are arranged in parallel, the resistance of the first touch electrode can be reduced, which facilitates to improve the touch sensitivity of the display panel.

In an exemplary embodiment shown in FIG. 13, in the case where the number of the second electrode sub-groups is less than that of the first electrode sub-groups, the first electrode sub-group 111 that is located at a position away from the first connection portion 12 in a relatively large distance has a relatively low resistance, so that it is unnecessary to provide the second electrode sub-group 112 connected with the first electrode sub-group 111 in parallel.

In an exemplary embodiment shown in FIG. 14, an insulation layer 4 is provided between the second sub-electrodes 1120 and the first sub-electrodes 1110 in a normal direction z of the touch display panel, and the vias 3 are formed in the insulation layer 4.

As shown in FIGS. 12 and 14, the first electrode sub-groups 111 and the second electrode sub-groups 112 are connected to each other by the vias 3 to form lamination portions 5. In one of the lamination portions 5, the second sub-electrode 1120 of the second electrode sub-group 112 has a width $W_{1120}$ that is smaller than a width $W_{1110}$ of the first sub-electrode 1110 of the first electrode sub-group 111. The difference between the width $W_{1110}$ of the first sub-electrode 1110 and the width $W_{1120}$ of the second sub-electrode 1120 is defined as a first difference value $\Delta W$, wherein $\Delta W=W_{1110}-W_{1120}$. The first difference values of two adjacent lamination portions 5 are equal to each other in the direction along which the first connection portion 12 directs toward the first touch electrode 11. With this arrangement, when forming the first touch electrode, masks with the same pattern may be selected to form the first sub-electrode 1110 and the second sub-electrode 1120, respectively. In this process, it is only required to adjust the exposure degree for forming the first sub-electrode 1110 and the second sub-electrode 1120, so that the exposure degree for forming the first sub-electrode 1110 with a relatively large width is less than that for forming the first sub-electrode 1110 with a relatively small width. Therefore, the forming process is simple and easy to operate without any additional mask, thereby saving costs.

Figure 15:
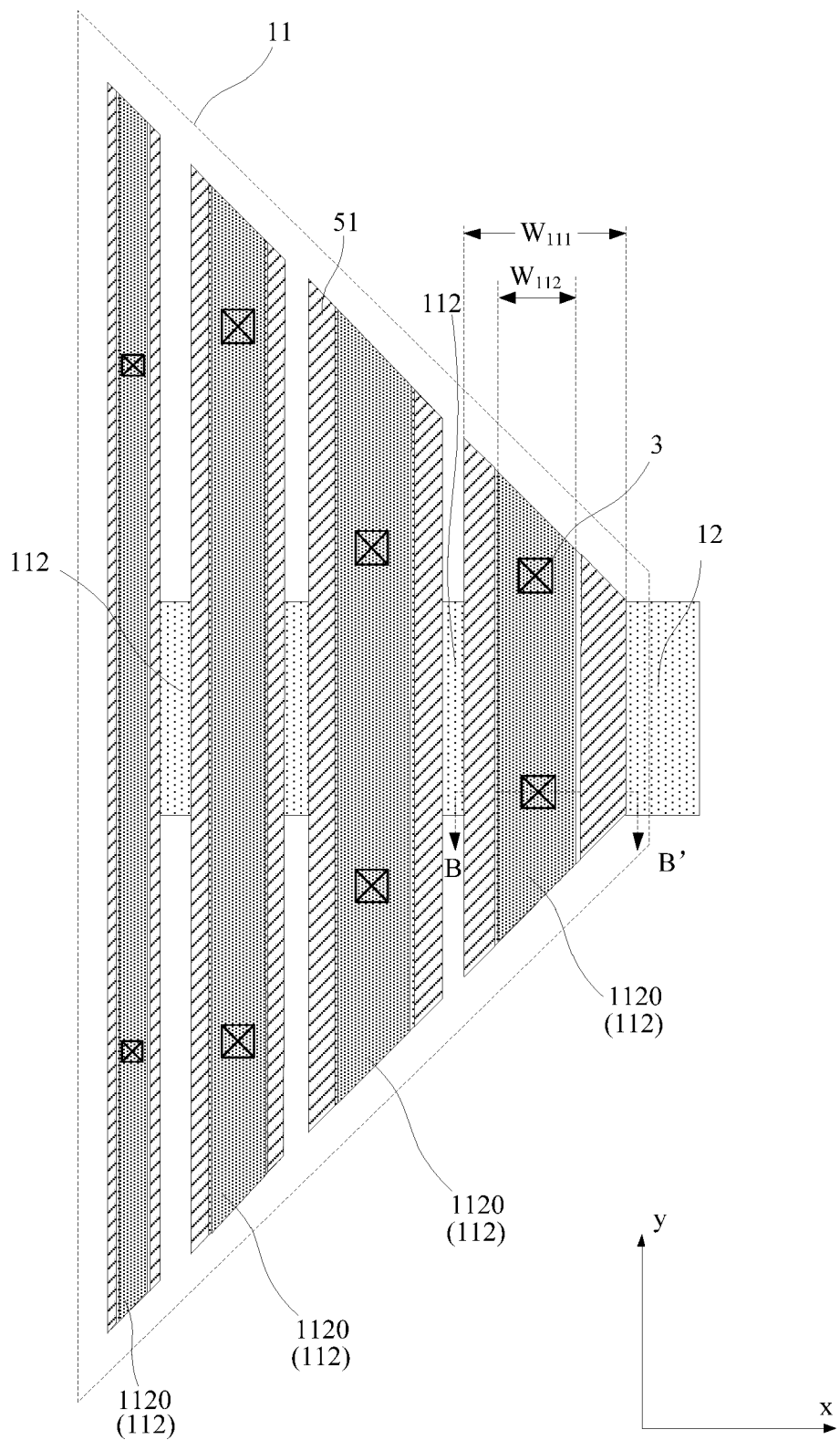
FIG. 15 is a schematic view of a yet another first touch electrode according to an embodiment of the present disclosure.
Figure 16:
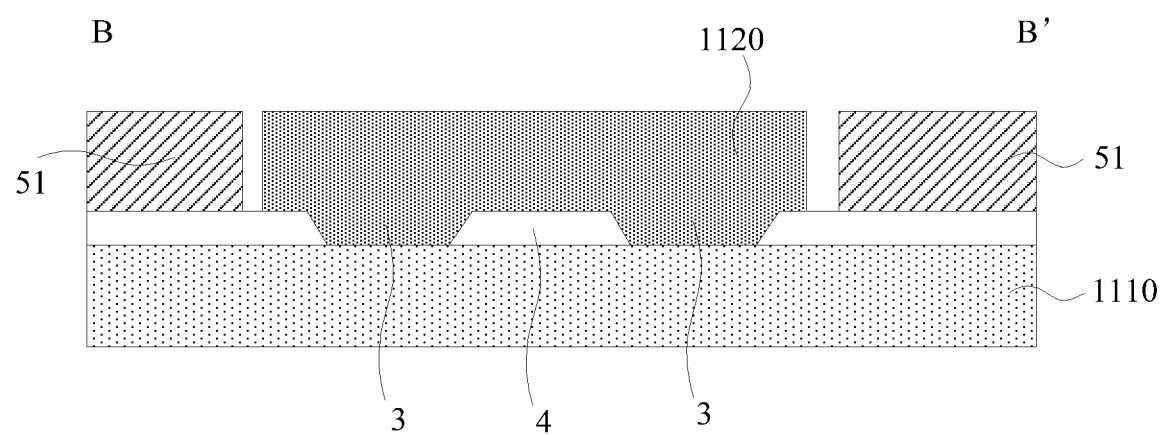
FIG. 16 is a schematic sectional view along line BB' in FIG. 15, according to an embodiment of the present disclosure.

In an exemplary embodiment shown in FIGS. 15 and 16, in which FIG. 15 is a schematic view of a yet another first touch electrode according to an embodiment of the present disclosure and FIG. 16 is a schematic sectional view along line BB' of FIG. 15, the touch display panel further includes a first dummy electrode 51 arranged in the same layer as the second sub-electrode 1120. Further, an orthographic projection of the first dummy electrode 51 on the plane of the touch display panel overlaps with that of the first sub-electrode 1110 on the plane of the touch display panel. The first dummy electrode 51 and the second sub-electrode 1120 are insulated from each other. The first dummy electrode 51 is floated, i.e., the first dummy electrode 51 is not loaded with any electrical signal. In this embodiment of the present disclosure, the first dummy electrode 51 is configured in a manner that the uniformity of light transmittance at different positions in the first touch electrode is improved. Further, the display effects at different positions in the touch display panel have good consistency while increasing the antistatic breakdown capability of the first touch electrode.

Figure 17:
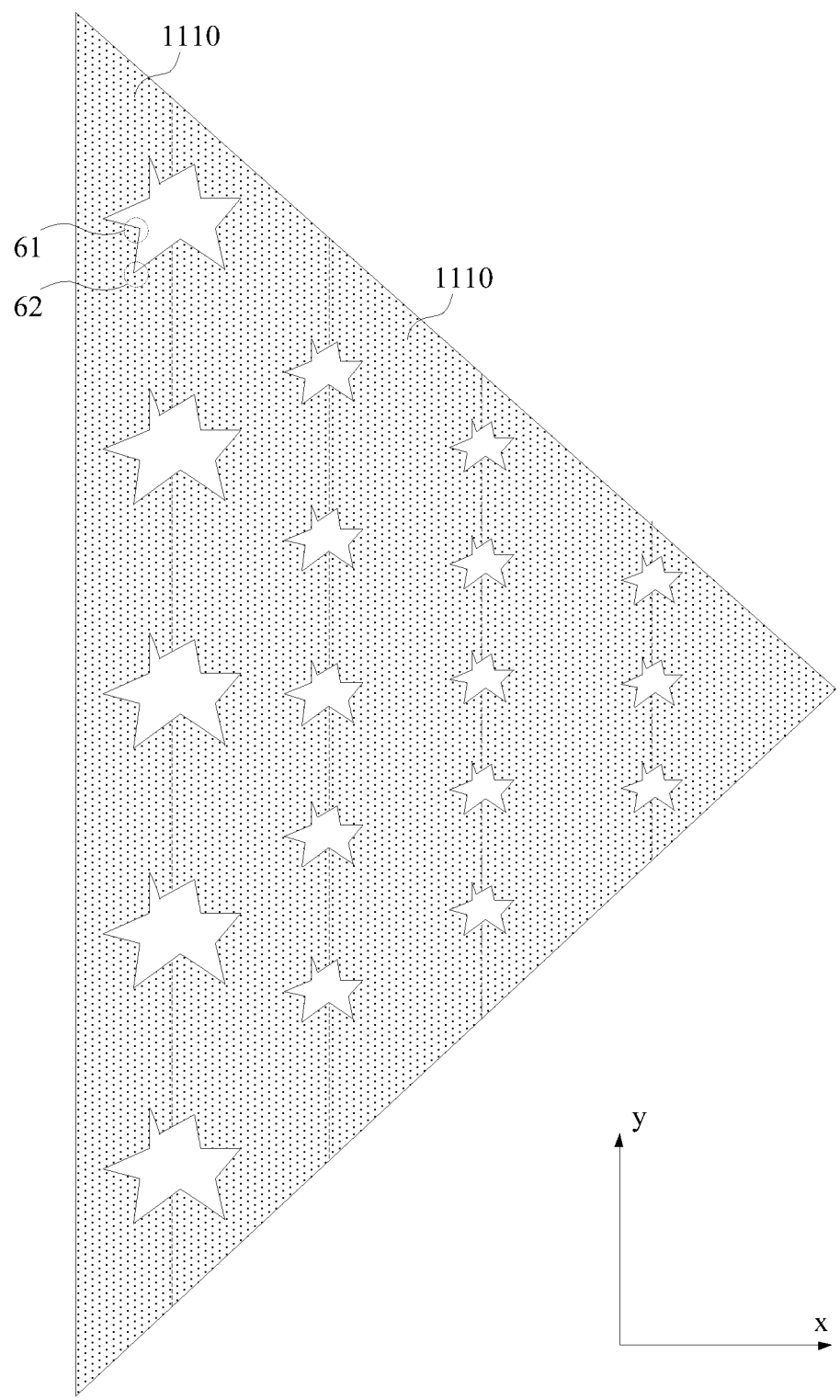
FIG. 17 is a schematic view of a still another first touch electrode according to an embodiment of the present disclosure.

In an exemplary embodiment of the present disclosure, the edges of the first sub-electrode 1110 includes a tip protruding feature and/or a tip recessed feature. As shown in FIG. 17 illustrating a schematic view of still another first touch electrode according to an embodiment of the present disclosure, the edges of the first sub-electrode 1110 includes a tip protruding feature 61 and a tip recessed feature 62. The tip protruding feature 61 protrudes towards a side away from a geometric center of the first sub-electrode 1110, and the tip recessed structure 62 is recessed toward a side close to the geometric center of the first sub-electrode 1110. The tip protruding feature 61 and the tip recessed feature 62 are configured to capture static electricity. When the static electricity is transmitted inwardly from the edges of the first touch electrode, the tip protruding feature 61 and the tip recessed feature 62 can actively absorb the static electricity, so that the static electricity can be limited at the tip protruding feature 61 and the tip recessed feature 62, thereby preventing the static electricity from being transmitted to other positions in the first touch electrode through the tip protruding feature 61 and the tip recessed feature 62. With this arrangement, the static electricity can be inhibited from being transmitted to the electrostatic weak locations in the first touch electrode, thereby reducing the possibility that the first touch electrode is electrostatically broken and thus improving the reliability of the first touch electrode.

Alternatively, in the embodiment of the present disclosure, the first touch electrodes 11, the second touch electrodes 21 and the first connection portions 12 may be arranged in the same layer, and the second touch electrodes 21 and the second connection portions 22 may be arranged in different layers. Alternatively, in some embodiments of the present disclosure, the first touch electrodes 11, the second touch electrodes 21 and the second connection portions 22 may be arranged in the same layer, and the first touch electrodes 11 and the first connection portions 12 may be arranged in different layers, and the embodiments of the present disclosure will not be limited thereto. As shown in FIGS. 2 to 4, the first touch electrodes 11 and the first connection portions 12 are arranged in the same layer. It should be noted that a boundary between the first touch electrode 11 and the first connection portion 12 shown in FIGS. 2 to 4 is to clearly illustrate the position relationship therebetween. In an actual film structure, when the first touch electrode 11 and the first connection portion 12 are arranged in the same layer, they are integrally formed and there is no boundary therebetween.

In this embodiment of the present disclosure, since the shape of the first touch electrode 11 arranged in the same layer as the first connection portion 12 is configured in the above manner, the antistatic capability of the first touch electrode unit including the first touch electrode 11 and the first connection portion 12 can be improved.

Figure 18:
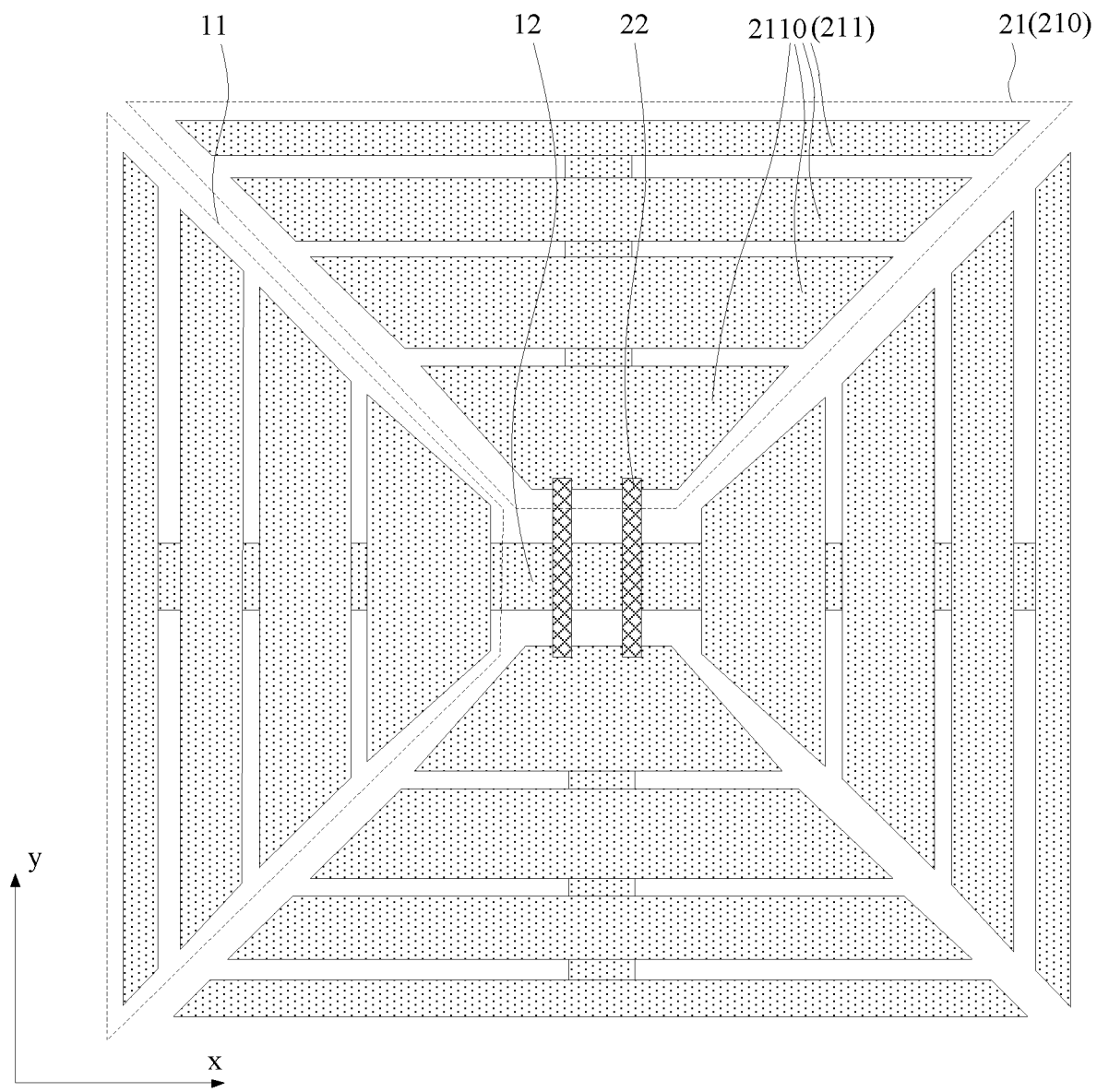
FIG. 18 is a schematic enlarged view of a partial region of another touch display panel according to an embodiment of the present disclosure.

Referring to FIGS. 2 and 18, FIG. 18 is a schematic enlarged view of a partial region of another touch display panel according to an embodiment of the present disclosure. In an exemplary embodiment of the present disclosure, as shown in FIGS. 2 and 18, the second touch electrode 21 further includes at least one second touch electrode sub-unit 210 that includes a plurality of third electrode sub-groups 211. Further, the plurality of third electrode sub-groups 211 are arranged in the second direction y. Each of the third electrode sub-groups 211 includes at least one third sub-electrode 2110 extending in the first direction x. The third sub-electrodes 2110 of two adjacent third electrode sub-groups 211 in the same second touch electrode sub-unit 210 have gradually increasing lengths and gradually decreasing widths in a direction from one of the second connection portions 22 closest to the second touch electrode sub-unit 210 to the second touch electrode sub-unit 210. Each of the third sub-electrodes 2110 has a length direction parallel to the first direction x and a width direction perpendicular to the first direction x. In this embodiment of the present disclosure, since the second touch electrode sub-unit 210 is provided with the plurality of third electrode sub-groups 211 and the length and the width of the third sub-electrode 2110 in each third electrode sub-group 211 are adjustable, the third electrode sub-groups 211 have substantially constant resistance. Therefore, the uniformity of the resistances at different positions in the second touch electrode including the plurality of third electrode sub-groups 211 can be improved, thereby increasing the antistatic breakdown capability of the second touch electrode.

It should be noted that the shapes of the first touch electrode and the second touch electrode shown in FIGS. 2 and 18 are merely illustrative, and the first touch electrode and the second touch electrode may have the same or different shape. In addition, the phrase "the first touch electrode and the second touch electrode have the same shape" means that they may have patterns in a same shape and different orientations. For example, one of the first touch electrode and the second touch electrode may overlaps with the other of the first touch electrode and the second touch electrode by rotation and/or translation. Alternatively, the shape of the pattern of the second touch electrode may be configured based on the shapes similar to those shown in FIGS. 3, 4, 8 to 13, 15, and 17.

Figure 19:
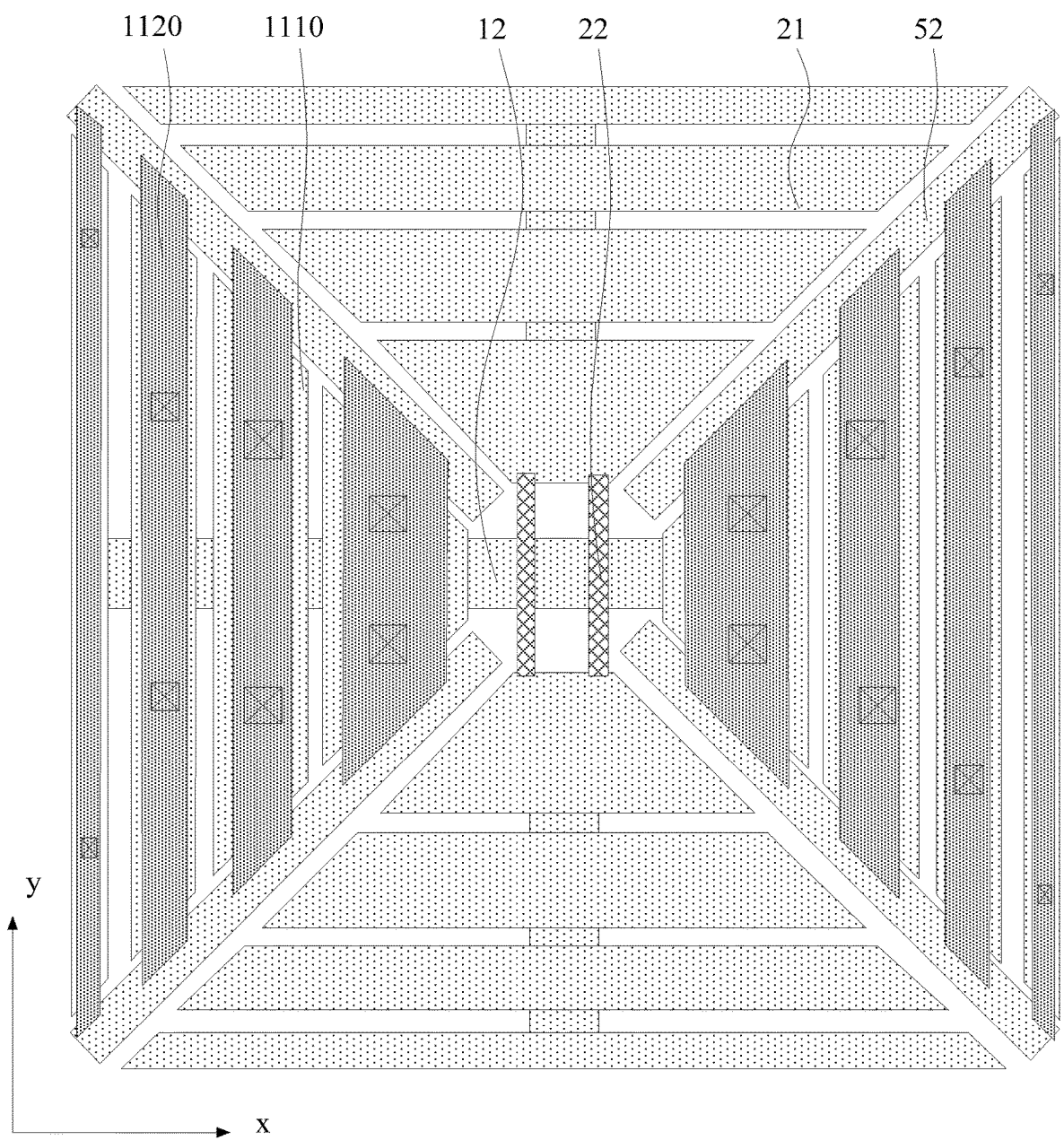
FIG. 19 is a schematic enlarged view of a partial region of a further another touch display panel according to an embodiment of the present disclosure.

Referring to FIG. 19, FIG. 19 is a schematic enlarged view of a partial region of a further another touch display panel according to an embodiment of the present disclosure. In an exemplary embodiment shown in FIG. 19, the touch display panel further includes a second dummy electrode 52. The second dummy electrode 52, the first touch electrodes and the second touch electrodes are arranged in the same layer. The second dummy electrode 52 is located between the first touch electrodes and the second touch electrodes. An orthographic projection of the second sub-electrode 1120 on the plane of the touch display panel at least partially overlaps with that of the second dummy electrode 52 on the plane of the touch display panel. With this arrangement, if a tip discharge occurs at an end of the second sub-electrode 1120, the floated second dummy electrode 52 is allowed to be affected by the static electricity prior to the first sub-electrode 1110 to perform touch signal transmission, which can further ensure the reliability of the first touch electrode.

In an exemplary embodiment of the present disclosure, the inter-group connection portion 112, the intra-group connection portion 1111 and the first sub-electrode 1110 may be formed by patterning different film layers. Alternatively, the inter-group connection portion 112, the intra-group connection portion 1111 and the first sub-electrode 1110 may also be formed by patterning the same film layer.

In the case where the inter-group connection portion 112, the intra-group connection portion 1111 and the first sub-electrode 1110 are formed in the same layer, a conductive film layer of a whole-layer structure may be formed on a substrate through a film-forming process, wherein the whole-layer structure refers to an entire film structure covering the substrate. A part of the conductive film layer is removed through a patterning process, such as exposure, etching and developing processes, and the remaining part of the conductive film layer corresponds to the inter-group connection portions 112, the intra-group connection portions 1111 and the first sub-electrodes 1110. The process thus is simple and easy to operate.

Moreover, in this embodiment of the present disclosure, the inter-group connection portions 112, the intra-group connection portions 1111 and the first sub-electrodes 1110 are formed in the same layer, which avoids disconnection or poor conductivity from being generated by poor contact between the intra-group connection portion 1111 and the first sub-electrode 1111 due to process errors when the inter-group connection portion 112, the intra-group connection portion 1111 and the first sub-electrode 1110 are formed in different layers. In addition, the same layer arrangement can avoid a total film thickness of the touch display panel from being increased, which is beneficial to the thinning of the touch display panel.

Alternatively, the inter-group connection portion 112, the intra-group connection portion 1111, the first sub-electrode 1110, the second sub-electrode 1120 and the third sub-electrode 2110 may be made of a transparent conductive oxide material such as one or more of Indium Tin Oxide (ITO), Indium Zinc Oxide (IZO) and Indium Gallium Zinc Oxide (IGZO). The second connection portion 22 may be made of a metal material or a transparent metal oxide material.

Figure 20:
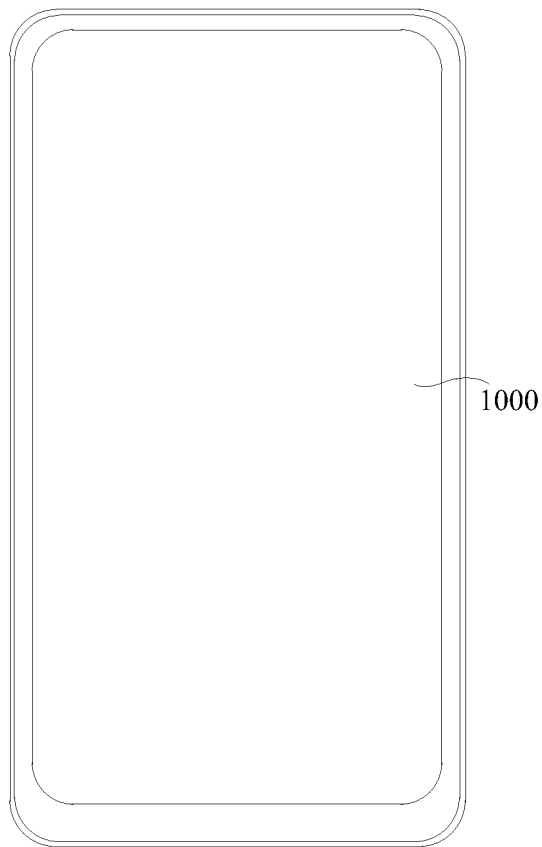
FIG. 20 is a schematic view of a touch display device according to an embodiment of the present disclosure.

An embodiment of the present disclosure also provides a touch display device including the touch display panel as described above. Referring to FIG. 20, FIG. 20 is a schematic view of a touch display device according to an embodiment of the present disclosure. As shown in FIG. 20, the touch display device includes the touch display panel 1000 as described above. The specific structure of the touch display panel 1000 has been described in detail in the described embodiments, and the description thereof will be omitted herein. The touch display device shown in FIG. 20 is merely illustrative. The display device may be any electronic device such as a mobile phone, a tablet computer, a notebook computer, an electronic paper book or a television, which has the display function, and the present disclosure is not limited thereto.

It should be appreciated that the embodiments of the present disclosure and the features in the embodiments may be combined with each other without confliction.

The above are only some embodiments of the present disclosure and are not intended to limit the present disclosure. Any amendment, equivalent replacement, modification, etc. made within the spirit and principle of the present disclosure shall fall within the scope of the present disclosure.

What is claimed is:

1. A touch display panel, comprising:
    a plurality of first touch electrode units, wherein each of the plurality of first touch electrode units comprises first touch electrodes and first connection portions that are alternately arranged in a first direction, each of the first connection portions is configured to connect two adjacent first touch electrodes of the first touch electrodes with each other, and the plurality of first touch electrode units is arranged in a second direction; and
    a plurality of second touch electrode units, wherein each of the plurality of second touch electrode units comprises second touch electrodes and second connection portions that are alternately arranged in the second direction, each of the second connection portions is configured to connect two adjacent second touch electrodes of the second touch electrodes with each other, and the plurality of second touch electrode units is arranged in the first direction,
    wherein each of the first touch electrodes comprises at least one first touch electrode sub-unit, each of the at least one first touch electrode sub-unit comprises a plurality of first electrode sub-groups arranged in the first direction, and each of the plurality of first electrode sub-groups comprises at least one first sub-electrode extending in the second direction;

wherein, in each first touch electrode sub-unit of the at least one first touch electrode sub-unit, the first sub-electrodes of two adjacent first electrode sub-groups have lengths gradually increasing in a direction from one of the first connection portions closest to the first touch electrode sub-unit to the first touch electrode sub-unit, and have widths gradually decreasing in the direction from the one of the first connection portions closest to the first touch electrode sub-unit to the first touch electrode sub-unit; and wherein the at least one first sub-electrode has a length direction parallel to the second direction and a width direction perpendicular to the second direction.

2. The touch display panel according to claim 1, wherein the at least one first sub-electrode comprises a plurality of first sub-electrodes that is arranged in the first direction and has a same width.

3. The touch display panel according to claim 2, wherein each of the plurality of first electrode sub-groups further comprises at least one intra-group connection portion that is located between two adjacent first sub-electrodes of the plurality of first sub-electrodes to connect the two adjacent first sub-electrodes of the plurality of first sub-electrodes with each other;

wherein, for an intra-group connection portion of the at least one intra-group connection portion and the two adjacent first sub-electrodes connected to each other, the intra-group connection portion has a width equal to a width of each of the two adjacent first sub-electrodes; and wherein, in a plane parallel to the touch display panel, an intra-group connection portion of the at least one intra-group connection portion has a width direction perpendicular to a direction along which a current flows through the intra-group connection portion.

4. The touch display panel according to claim 3, wherein, in each of the plurality of first electrode sub-groups, the at least one intra-group connection portion comprises a plurality of intra-group connection portions that is located between the two adjacent first sub-electrodes and arranged in the second direction, and a distance between two adjacent intra-group connection portions of the plurality of intra-group connection portions is equal to a distance between the two adjacent first sub-electrodes.

5. The touch display panel according to claim 2, wherein each of the first touch electrodes further comprises inter-group connection portions, and the inter-group connection portions are located between two adjacent first electrode sub-groups of the plurality of first electrode sub-groups and configured to connect the two adjacent first electrodes sub-groups with each other;

wherein the inter-group connection portion has a width equal to a width of a first sub-electrode of the plurality of first sub-electrodes in a first sub-electrode group of the plurality of first sub-electrode groups connected to the inter-group connection portion; and wherein, in a plane parallel to the touch display panel, the inter-group connection portions have a width direction perpendicular to a direction along which a current flows through the inter-group connection portions.

6. The touch display panel according to claim 1, wherein each of the first touch electrodes further comprises hollow portions and at least one inter-group connection portion, and the at least one inter-group connection portion is located between two adjacent first electrode sub-groups of the plurality of first electrode sub-groups and configured to connect the two adjacent first electrode sub-groups with each other; and Wherein, a hollow portion of the hollow portions is located between the two adjacent first electrode sub-groups, and the at least one inter-group connection portion and the hollow portions are arranged in the second direction.

7. The touch display panel according to claim 6, wherein the at least one inter-group connection portion comprises at least two inter-group connection portions arranged between the two adjacent first electrode sub-groups, and each of the hollow portions is located between two adjacent inter-group connection portions of the at least two inter-group connection portions in the second direction; and wherein, in a direction from a first connection portion of the first connection portions to a first touch electrode of the first touch electrodes corresponding to the one first connection portion, the hollow portions of the first touch electrode have lengths gradually increasing in the second direction.

8. The touch display panel according to claim 1, wherein each of the first touch electrodes further comprises inter-group connection portions, each of the inter-group connection portions is located between two adjacent first electrode sub-groups of the plurality of first electrode sub-groups, and one of the inter-group connection portions is arranged between the two adjacent first electrode sub-groups and configured to connect the two adjacent first electrode sub-groups with each other;

wherein the inter-group connection portions have a width equal to a width of the first connection portions, and a width direction perpendicular to a direction along which a current flows through the inter-group connection portions; and wherein, in a plane parallel to the touch display panel, a width direction of the first connection portions is perpendicular to a direction along which the current flows through the first connection portions.

9. The touch display panel according to claim 8, wherein two adjacent inter-group connection portions of the inter-group connection portions are staggered in the first direction.

10. The touch display panel according to claim 1, wherein each of the first touch electrodes further comprises M second electrode sub-groups, wherein M is an integer greater than or equal to 1;

wherein each of the M second electrode sub-groups comprises at least one second sub-electrode located in different layers from the at least one first sub-electrode;

wherein a number of the M second electrode sub-groups is less than or equal to a number of the plurality of first electrode sub-groups, and each of the M second electrode sub-groups are connected to at least one first electrode sub-group of the plurality of first electrode sub-groups by a via;

wherein an orthographic projection of each of the at least one second sub-electrode on a plane of the touch display panel overlaps with an orthographic projection of a corresponding first sub-electrode of the at least one first sub-electrode on the plane of the touch display panel;

wherein, in a direction from a first connection portion of the first connection portions to a first touch electrode of the first touch electrodes corresponding to the a first connection portion, the second sub-electrodes of two adjacent second electrode sub-groups of the M second electrode sub-groups in the first touch electrode have gradually increasing lengths and gradually decreasing widths; and wherein a second sub-electrode of the at least one second sub-electrode has a length direction parallel to the length direction of a first sub-electrode of the at least one first sub-electrode and a width direction parallel to the width direction of the first sub-electrode.

11. The touch display panel according to claim 10, wherein each of the M second electrode sub-groups are connected to the at least one first electrode sub-group by the via to form a lamination portion;

wherein, in the lamination portion, the at least one second sub-electrode of the second electrode sub-group has a width that is smaller than a width of the at least one first sub-electrode of the at least one first electrode sub-group, and a difference between the width of the at least one first sub-electrode and the width of the at least one second sub-electrode is defined as a first difference value; and wherein the first difference values of two adjacent lamination portions are equal to each other in the direction from the one first connection portion to the one first touch electrode.

12. The touch display panel according to claim 10, further comprising:

a first dummy electrode arranged in a same layer as the second sub-electrodes of the M second electrode sub-groups, wherein an orthographic projection of the first dummy electrode on the plane of the touch display panel overlaps with an orthographic projection of the first sub-electrodes of the plurality of first electrode sub-groups on the plane of the touch display panel; and wherein the first dummy electrode and the second sub-electrodes are insulated from each other.

13. The touch display panel according to claim 12, further comprising:

a second dummy electrode, wherein the second dummy electrode, the first touch electrodes of the plurality of first electrode sub-groups and the second touch electrodes of the M second electrode sub-groups are arranged in a same layer, wherein an orthographic projection of the second sub-electrodes on the plane of the touch display panel at least partially overlaps with an orthographic projection of the second dummy electrode on the plane of the touch display panel.

14. The touch display panel according to claim 1, wherein each of the first sub-electrodes of the plurality of first electrode sub-groups has edges, each of which comprises at least one of a tip protruding feature or a tip recessed feature;

wherein the tip-protruding feature protrudes toward a side away from a geometric center of the first sub-electrode; and wherein the tip recessed feature is recessed toward a side close to the geometric center of the first sub-electrode.

15. The touch display panel according to claim 1, wherein the first touch electrodes and the first connection portions are arranged in a same layer; and wherein the second touch electrodes and the first touch electrodes are arranged in the same layer, and the second touch electrodes are arranged in a different layer from the second connection portions.

16. The touch display panel according to claim 15, wherein each of the second touch electrodes comprises at least one second touch electrode sub-unit, and each of the at least one second touch electrode sub-unit comprises a plurality of third electrode sub-groups arranged in the second direction;

wherein each of the plurality of third electrode sub-groups comprises at least one third sub-electrode extending in the first direction;

wherein, in each of the at least one second touch electrode sub-unit, the third sub-electrodes of two adjacent third electrode sub-groups have gradually increasing lengths and gradually decreasing widths in a direction from a second connection portion of the second connection portions closest to the second touch electrode sub-unit to the second touch electrode sub-unit; and wherein a third sub-electrode of the at least one third sub-electrode of each of the plurality of third electrode sub-groups has a length direction parallel to the first direction and a width direction perpendicular to the first direction.

17. A touch display device, comprising a touch display panel, wherein the touch display panel comprises:

a plurality of first touch electrode units, wherein each of the plurality of first touch electrode units comprises first touch electrodes and first connection portions that are alternately arranged in a first direction, each of the first connection portions is configured to connect two adjacent first touch electrodes of the first touch electrodes with each other, and the plurality of first touch electrode units is arranged in a second direction; and a plurality of second touch electrode units, wherein each of the plurality of second touch electrode units comprises second touch electrodes and second connection portions that are alternately arranged in the second direction, each of the second connection portions is configured to connect two adjacent second touch electrodes of the second touch electrodes with each other, and the plurality of second touch electrode units is arranged in the first direction, wherein each of the first touch electrodes comprises at least one first touch electrode sub-unit, each of the at least one first touch electrode sub-unit comprises a plurality of first electrode sub-groups arranged in the first direction, and each of the plurality of first electrode sub-groups comprises at least one first sub-electrode extending in the second direction;

wherein in each first touch electrode sub-unit of the at least one first touch electrode sub-unit, the first sub-electrodes of two adjacent first electrode sub-groups have lengths gradually increasing in a direction from one of the first connection portions closest to the first touch electrode sub-unit to the first touch electrode sub-unit, and have widths gradually decreasing in the direction from the one of the first connection portions closest to the first touch electrode sub-unit to the first touch electrode sub-unit; and wherein the at least one first sub-electrode has a length direction parallel to the second direction and a width direction perpendicular to the second direction.

* * * * *